(12) United States Patent
Tanaka

(10) Patent No.: US 7,359,087 B2
(45) Date of Patent: Apr. 15, 2008

(54) PRINT CONTROL APPARATUS AND PROGRAM

(75) Inventor: Tatsuo Tanaka, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 1008 days.

(21) Appl. No.: 10/348,152

(22) Filed: Jan. 21, 2003

(65) Prior Publication Data
US 2003/0142331 A1 Jul. 31, 2003

(30) Foreign Application Priority Data
Jan. 30, 2002 (JP) ............................. 2002-021503

(51) Int. Cl.
G06F 15/00 (2006.01)
B41J 1/00 (2006.01)
(52) U.S. Cl. ...................... 358/1.9; 358/448; 358/3.28; 358/501; 358/540; 399/366
(58) Field of Classification Search ................. 358/1.9, 358/448, 3.28, 501, 540; 395/109; 399/366
See application file for complete search history.

(56) References Cited

U.S. PATENT DOCUMENTS 4,766,026 A * 8/1988 Lass et al. .................. 428/203
6,185,404 B1 * 2/2001 Hasuo et al. ................ 399/366
6,567,534 B1 * 5/2003 Rhoads ........................ 382/100
6,731,776 B1 * 5/2004 Fujiwara ..................... 382/100
2002/0163671 A1 * 11/2002 Takaragi ..................... 358/3.28

FOREIGN PATENT DOCUMENTS

JP 2001-346034 A 12/2001

\* cited by examiner

Primary Examiner—King Y. Poon
Assistant Examiner—Quang N. Vo
(74) Attorney, Agent, or Firm—Frishauf, Holtz, Goodman & Chick, PC

(57) ABSTRACT

An print control apparatus for printing a reproduction checking image in colors. In a print control apparatus 1 that has a printing device 6 to print a document, a CPU 2 combines a remaining pattern image composed of dots larger than a minimum dot size readable by a color copying machine and a vanishing pattern image composed of dots having the same size as the larger dot and dots smaller than the minimum dot readable by the color copying machine to produce a reproduction checking image and causes the printing device 6 to print the reproduction checking image along with document print data on paper (FIG. 1).

8 Claims, 23 Drawing Sheets

| FONT | LETTER | SIZE | POP-UP FLAG |
|---|---|---|---|
| ○○ A | I | 6pt | 0 |
| ×× GOTHIC | E | 6pt | 0 |
| ○○ GOTHIC | K | 8pt | 0 |
| ○○ GOTHIC | P | 8pt | 0 |
| ○○ GOTHIC | - | 8pt | 0 |
| ×× A | COPY | 6pt | 1 |
| ×× A | ORIGINAL | 6pt | 1 |
| ⋮ | ⋮ | ⋮ | ⋮ |

| PATTERN KIND | UNIT REMAINING PATTERN IMAGE | REMAINING PATTERN IMAGE DOT STRUCTURE | UNIT VANISHING PATTERN IMAGE | VANISHING PATTERN IMAGE DOT STRUCTURE |
|---|---|---|---|---|
| CHERRY BLOSSOM | | LARGER, MAGENTA | | LARGER, MAGENTA / SMALLER, CYAN |
| PLAIN | | LARGER, MAGENTA | | LARGER, MAGENTA / SMALLER, YELLOW |
| HEXAGON | | LARGER, CYAN | | LARGER, CYAN / SMALLER, YELLOW |
| CIRCLE | | LARGER, GREEN | | LARGER, GREEN / SMALLER, CYAN |
| ⋮ | ⋮ | ⋮ | ⋮ | ⋮ |

FIG.3

ESTIMATE

To: _____  Date:

●●Ltd.

Note:
1. Effective term: Month (s)
2. Price including the freight charge

|   | Name | Unit price | N | Total | Note |
|---|------|-----------|---|-------|------|
|   |      |           |   |       |      |
|   |      |           |   |       |      |
|   |      |           |   |       |      |
|   |      |           |   |       |      |
|   |      |           |   |       |      |
|   |      |           |   |       |      |
|   |      |           |   |       |      |
|   |      |           |   |       |      |
|   |      |           |   |       |      |
|   |      |           |   | Total |      |
|   |      |           |   | Consum. tax |  |
|   |      |           |   | Total |      |

FIG.13

▲▲▲Ltd.   Feb, 20, 2000

Month (s)

Article A   10,000   10   100,000   with a stand
Article B   20,000    5   100,000   a type
Article C    5,000   10    50,000   handle 100,000
12,500
262,500

FIG.14

ESTIMATE

To: ▲▲▲Ltd.  Date: Feb, 20, 2000
●●Ltd.

Note:
1. Effective term: Month (s)
2. Price including the freight charge

|  | Name | Unit price | N | Total | Note |
|---|---|---|---|---|---|
|  | Article A | 10,000 | 10 | 100,000 | with a stand |
|  | Article B | 20,000 | 5 | 100,000 | a type |
|  | Article C | 5,000 | 10 | 50,000 | handle |
|  |  |  |  |  |  |
|  |  |  |  |  |  |
|  |  |  |  |  |  |
|  |  |  |  |  |  |
|  |  |  |  |  |  |
|  |  | Total |  | 100,000 |  |
|  |  | Consum. tax |  | 12,500 |  |
|  |  | Total |  | 262,500 |  |

ESTIMATE

To: ▲▲▲Ltd.  Date: Feb, 20, 2000
　　　　　　　　　　●●Ltd.

Note:
1. Effective term: Month (s)
2. Price including the freight charge

| Name | Unit price | N | Total | Note |
|---|---|---|---|---|
| Article A | 10,000 | 10 | 100,000 | with a stand |
| Article B | 20,000 | 5 | 100,000 | a type |
| Article C | 5,000 | 10 | 50,000 | handle |
|  |  |  |  |  |
|  |  |  |  |  |
|  |  |  |  |  |
|  |  |  |  |  |
|  |  |  |  |  |
|  | Total | | 250,000 | |
|  | Consum. tax | | 12,500 | |
|  | Total | | 262,500 | |

(ORIGINAL stamp overlay)

FIG.17

ESTIMATE

To: ▲▲▲Ltd.  Date: Feb, 20, 2000
　　　　　　　　　　●●Ltd.

Note:
1. Effective term: Month (s)
2. Price including the freight charge

| Name | Unit price | N | Total | Note |
|---|---|---|---|---|
| Article A | 10,000 | 10 | 100,000 | with a stand |
| Article B | 20,000 | 5 | 100,000 | a type |
| Article C | 5,000 | 10 | 50,000 | handle |
|  |  |  |  |  |
|  |  |  |  |  |
|  |  |  |  |  |
|  |  |  |  |  |
|  |  |  |  |  |
|  | Total | | 100,000 | |
|  | Consum. tax | | 12,500 | |
|  | Total | | 262,500 | |

| PATTERN KIND | UNIT PATTERN IMAGE |
|---|---|
| CHERRY BLOSSOM | ❋ ❋ ❋<br>❋ ❋ ❋ |
| PLAIN |  |
| HEXAGON | ⬢ ⬢ ⬢<br>⬢ ⬢ ⬢ |
| CIRCLE | ● ● ●<br>● ● ● |
| ⋮ | ⋮ |

| No. | UNIT REMAINING PATTERN IMAGE | UNIT VANISHING PATTERN IMAGE |
|---|---|---|
| 1 | LARGER, MAGENTA | LARGER, MAGENTA<br>SMALLER, CYAN |
| 2 | LARGER, MAGENTA | LARGER, MAGENTA<br>SMALLER, YELLOW |
| 3 | LARGER, CYAN | LARGER, CYAN<br>SMALLER, YELLOW |
| 4 | LARGER, GREEN | LARGER, GREEN<br>SMALLER, CYAN |
| ⋮ | ⋮ | ⋮ |

FIG.20

35
| FIGURE KIND | FIGURE |
|---|---|
| RECTANGLE |  |
| TRIANGLE | 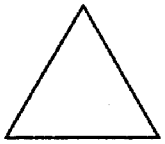 |
| CIRCLE | 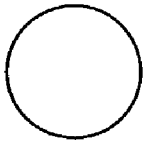 |
| TREE1 |  |
| TREE2 |  |
| ⋮ | ⋮ |
FIG.25

PRINT CONTROL APPARATUS AND PROGRAM

FIELD OF THE INVENTION

The present invention relates to a print control apparatus and program that causes a copying machine to print an image different from its original.

BACKGROUND ART

Important documents such as gold notes/deeds often have printed images thereon that will appear as different ones when copied by a general color copying machine to thereby check the accurate copying of the original images. Such image is referred to as a "reproduction checking image". It is known that such reproduction checking image is composed of a vanishing or discoloring image (hereinafter described simply as "vanishing image") that will vanish or discolor when copied by the copying machine and a remaining copyable image. By combining a vanishing image and a remaining image, a reproduction checking image on an original document that causes its invisible characters/figures to appear on a reproduction or a reproduction checking image on a document in which visible characters/figures will vanish after copied can be created. Since a document with such a reproduction checking image thereon provides a reproduction obviously different from the original when copied, it is expected that illegal copying can be checked.

A document with such a reproduction checking image thereon has been produced by printing various matters on a sheet of paper on which the reproduction checking image is printed beforehand. Recently, a user can create and print with a page printer a desired reproduction checking image on a sheet of plain paper. In addition, a copied image can be printed in color since color printers have diffused and provided high resolution.

Even when a reproduction checking image is printed in color, however, a reproduction checking image, which has been printed in a monochromatic manner, is only printed in a single color other than black, and has produced only a visual different effect due to on a part of the reproduction checking image being not copied. Therefore, there is an increasing need for reproduction checking images that produce new visual different effects using a combination of various colors.

It is an object of the present invention to provide a print control apparatus capable of printing a color reproduction checking image that produces a visual different effect, using a combination of various colors.

SUMMARY OF THE INVENTION

In order to achieve the above object, according to one aspect of the present invention there is provided a print control apparatus comprising:
means for producing a reproduction checking image that includes a non-discoloring image to be output as an image having the same color as the non-discoloring image when copied, said discoloring image having a color different from that of the discoloring image when copied; and
control means for causing a printing device to print in a predetermined color the reproduction checking image produced by said reproduction checking image producing means.

Therefore, according to the present invention, a reproduction image is printed that when copied, produces such a different visual effect that a part of the image becomes discolored to thereby provide a document that is recognized at a glance as obtained as a result of copying its original.

According to another aspect of the present invention, there is provided a print control apparatus comprises:
means for specifying a non-discoloring image to be output as an image having the same color as the non-discoloring image when copied by a color copying machine;
means for specifying a discoloring image to be output as having a different color from the discoloring image when copied by the color copying machine;
means for producing a reproduction checking image including the non-discoloring image and the discoloring image; and
control means for causing a printing device to print in a predetermined color the reproduction checking image produced by said producing means.

Accordingly, parts of the reproduction checking image that remains undisclosed and are discolored when copied by a general color copying machine can be specified optionally to thereby produces a different visual effect. Thus, documents with any images printed thereon in any combination of colors are obtained whose copying can be recognized at a glance.

BRIEF DESCRIPTION OF THE DRAWINGS

FIG. 2 schematically illustrates a structure of a character attribute table 31 stored in a ROM 3 of FIG. 1.

FIG. 3 schematically illustrates a structure of a pattern image table 32 stored in the ROM 3 of FIG. 1.

FIGS. 7A and B each illustrate how a reproduction checking image produced in the first embodiment is copied, wherein FIG. 7A shows the case in which the reproduction checking image includes a vanishing image.

FIG. 13 illustrates a document form stored in a document form data file 5c of FIG. 4.

FIG. 14 illustrates one example of print data stored in the document form data file 5d of FIG. 4.

FIG. 17 illustrates one example of a document which the document print image of FIG. 15 and the reproduction checking image of FIG. 16 are printed.

FIG. 18 shows a state of a reproduction of the document of FIG. 17 obtained by a copying machine.

FIG. 19 schematically illustrates a structure of a pattern table 33 stored in a ROM 3 in a second embodiment according to the present invention.

FIG. 20 schematically illustrates a structure of a color scheme table 34 stored in the ROM 3 in the second embodiment.

FIG. 25 schematically illustrates a structure of a figure table 35 stored in a ROM 3 in a third embodiment according to the present invention.

DETAILED DESCRIPTION OF THE PREFERRED EMBODIMENTS

Referring to FIGS. 1-18, a first embodiment of the present invention will be described next.

Figure 1:
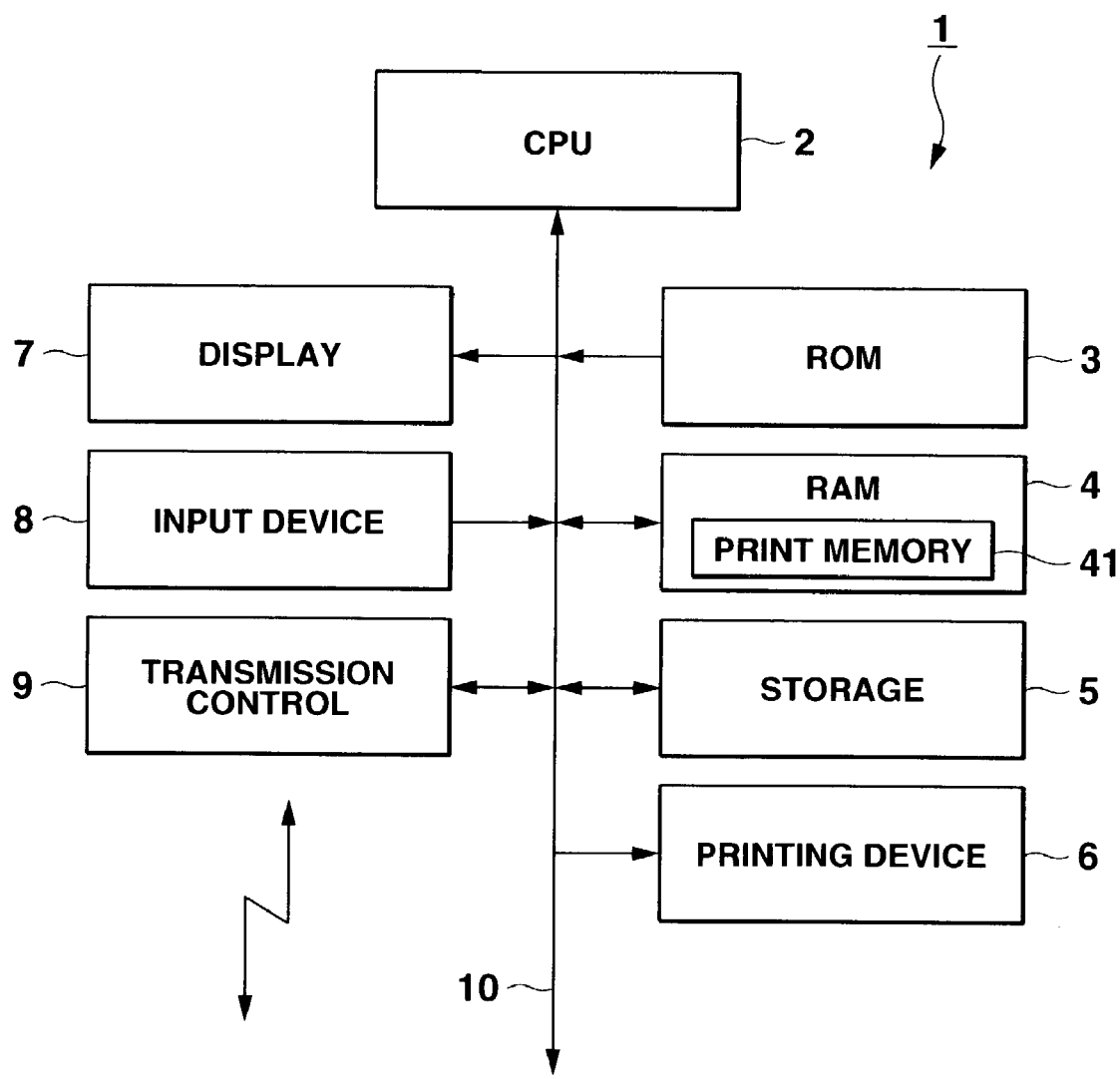
FIG. 1 is a block diagram indicative of a structure of a document outputting apparatus 1 as a first embodiment of the present invention.

FIG. 1 is a block diagram indicative of a structure of a print control apparatus 1 of the first embodiment. As shown in FIG. 1, the print control apparatus 1 comprises a CPU (Central Processing Unit) 2, a ROM (Read Only Memory) 3, a RAM (Random Access Memory) 4, a storage device 5, a printing device 6, a display device 7, an input device 8 and a transmission control device 9, which are together connected to a buss 10.

The CPU 2 reads out a system program and various application programs stored in the storage device 5, develops the respective programs in a program storage area (not shown) in the RAM 4, performs various processing based on the respective programs, temporarily stores the results of the respective processing in a work area (not shown) of the RAM 4, and displays the result of the processing on the display device 7. The CPU 2 saves the results of the processing at specified locations in the storage device 5 based on respective operation signals received from the input device 8.

More specifically, the CPU 2 reads out and executes a transaction application file 5a stored in the storage device 5 to thereby create, for example, a charge or an estimate and execute the respective transaction processes corresponding to the input commands. The CPU 2 then stores the data produced by the transaction processes into a print data memory 41a of the RAM 4.

The CPU 2 also produces signals to display data created by the respective transaction processes and the inputs at the input device 8, and delivers and displays the signals to and on the display device 7.

The CPU 2 also performs a printing process (FIG. 10) in accordance with a command input at the input device 8, produces a reproduction checking image based on various conditions input at the input device 8, causes the printing device 6 to print the reproduction checking image and the print data produced by the transaction process in predetermined colors on printing paper to thereby produce a corresponding document.

The reproduction checking image is difficult for a general color copying machine to copy completely such that when the general copying machine tries to copy a document on which such reproduction checking image is printed, it would produce a reproduction of an image different from the original one. In the print control apparatus 1 of the first embodiment, the reproduction checking image to be used comprises two different images, i.e., a remaining image and a vanishing or discoloring image.

Each of the remaining and vanishing images is printed in color. The remaining image remains unchanged when copied by the color copying machine whereas the vanishing image vanishes or becomes discolored when copied. When a reproduction checking image formed on a document, including a vanishing image of characters/figures and a remaining image as a background, is copied by the color copying machine, a print is obtained in which only the characters/figures are discolored. In addition, if the vanishing image on the original is copied as a discolored one by the copying machine so as to have the same color as the remaining image, the characters/figures can not be recognized visually on the copied machine although they can be recognized visually on the original. That is, when a document (print) on which a reproduction checking image is printed by the print control apparatus 1 is copied, a copy greatly different in image from the original is output and hence the effect of checking illegal copying is expected.

In the printing process, the CPU 2 receives as the inputs the conditions of producing the reproduction checking image such as characters, their fonts sizes, angles and arrangement for a character string to be used for the reproduction checking image, and selection/designation of patterns to be used in the reproduction checking image, performs a reproduction checking image producing process (FIG. 11) to be described later to thereby produce the reproduction checking image with the character strings and patterns arranged thereon, and then stores the produced image in a work area of the RAM 4.

Subsequently, the CPU 2 stores the document form data stored in a document form data file 5c and the print data stored in the print data file 5d in a form data memory 41b and the print data memory 41a, respectively, of RAM 4, produces document print data synthesized from those data, combines the reproduction checking image data stored in the RAM 4 with the document print data to produce synthetic document data to print a document with the reproduction checking image, and causes the printing device 6 to output a printed document.

When performing the printing process, the CPU 2 displays on the display device 7 a reproduction checking image editing picture 71 (FIG. 12) into which the above-mentioned production conditions will be input.

The ROM 3 is a non-volatile memory that stores in a manner in which the CPU 2 can read the tables, a character attribute table 31 and a pattern image table 32, to which the CPU 2 refers in the printing process.

FIG. 2 schematically illustrates a composition of the character attribute table 31. As shown in FIG. 2, the character attribute table 31 is one on which a pop-up flag is set, indicating whether or not each of various characters should be displayed in a pop-up manner for font and size on the reproduction checking image editing picture 71.

Many character strings such as "copy" and/or "invalidation" are used frequently in a reproduction checking image. A pop-up flag "1" is set for each of character strings to be used frequently on the character attribute table 31. These character strings are displayed in a pop-up manner when a character input device 712 on the reproduction checking image editing picture 71 is operated, and selected by a simple selective operation. In the example of FIG. 2, each of character strings such as "copy" and "invalidation" to be used very frequently is regarded as a single character string to thereby achieve efficient processing.

FIG. 3 schematically illustrates a structure of a pattern image table 32, which has stored pattern names indicative of the kinds of patterns, unit remaining pattern images, their dot structures, unit vanishing pattern images, and their dot structures in corresponding relationship.

Figure 12:
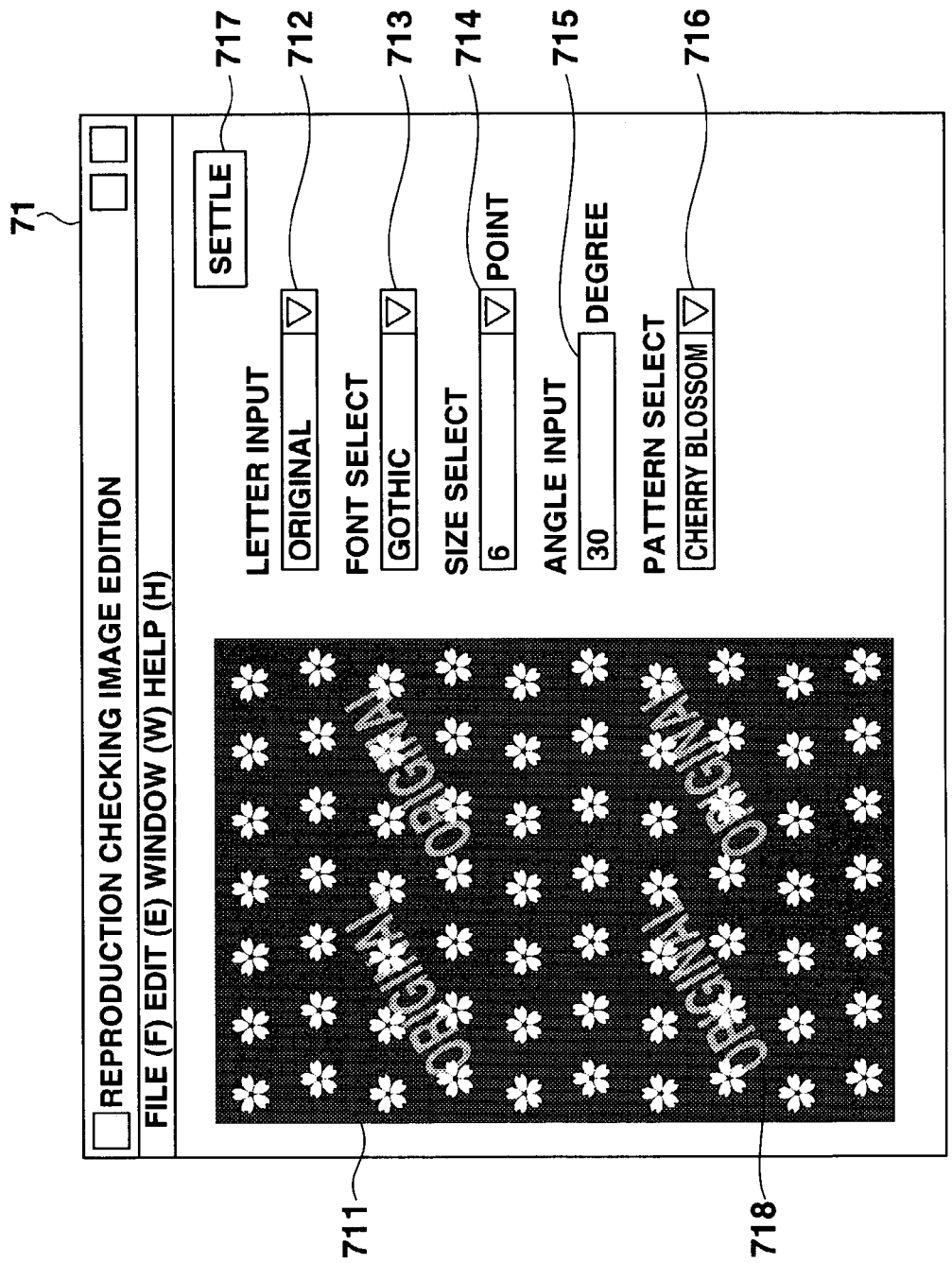
FIG. 12 illustrates one example of a reproduction checking image editing picture 71 displayed on a display device 7 during a printing process of FIG. 10.

The kinds of patterns each are displayed in a pattern selector 716 on the reproduction checking image editing picture 71 (FIG. 12).

The unit remaining pattern image is a color image of a predetermined size which will be used to produce a remaining image in the reproduction checking image producing process (FIG. 11), and is composed only of dots larger than a minimum size reproducible by the general color copying machine.

The unit vanishing pattern image is a color image of a predetermined size to be used to produce a vanishing image in the reproduction checking image producing process (FIG. 11), and is composed of dots greater than the minimum size reproducible by the copying machine and dots smaller than the minimum size irreproducible by the copying machine.

The unit remaining pattern image dot structure is indicative of the size and color of dots composing the unit remaining pattern image. The vanishing pattern image dot structure is indicative of the size and color of dots composing the unit vanishing pattern image. For example, in the pattern image table 32 of FIG. 3, the unit remaining pattern image dot structure for "cherry blossom" pattern can be set to "larger, magenta", so that the unit remaining pattern image is composed only of magenta dots larger than the minimum size. The unit vanishing pattern image dot structure "cherry blossom" pattern can be "larger, magenta, smaller, cyan", so that the unit vanishing pattern image is composed only of larger magenta dots than the minimum size and smaller cyan dots than the minimum size.

In the structure of the pattern image table 32, the "unit remaining and vanishing pattern image dot structures" are not essential. In the pattern image table 32, the unit remaining pattern image is a color image composed only of the larger dots having the predetermined color. Similarly, the unit vanishing pattern image is a color image composed of larger and smaller dots having a predetermined color. Thus, in a printing process (FIG. 10) to be described later, the CPU 2 is capable of performing required steps without referring to the items "unit remaining and vanishing pattern image dot structures". Herein, for convenience of explanation, the items "unit remaining and vanishing pattern image dot structures" are shown.

The RAM 4 develops the system program and various application programs to be executed by the CPU 2 in a program storage area (not shown) and temporarily stores in a work area (not shown) data related to the programs such as commands input at the input device 8, input data, and results of processing by the execution of the programs.

Figure 4:
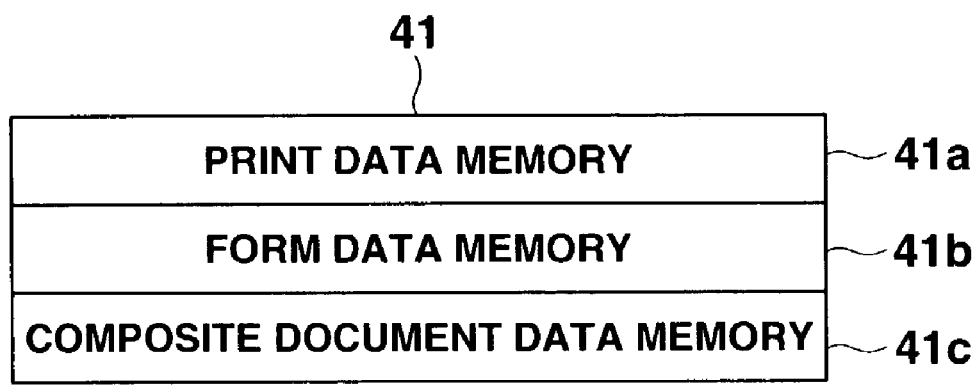
FIG. 4 schematically shows a structure of a print memory 41 of a RAM 4.

The RAM 4 has a print memory 41 in which data to be used for printing a document is stored. FIG. 4 schematically illustrates a structure of the print memory 41. As shown in FIG. 4, the print memory 41 comprises a print data memory 41*a*, a form data memory 41*b*, and a composite print data memory 41*c*.

The print data memory 41*a* stores print data such as client names, commodity names, and sums of money produced in the above-mentioned transaction process and to be printed on a document.

The form data memory 41*b* stores data indicative of document forms involving a title of a document, a date fill-in column, printing positions of ruled lines, etc., created by the print control apparatus 1.

The composite print data memory 41*c* stores composite document data composed of the data stored in the print data memory 41*a*, the data on the document form stored in the form data memory 41*b* and the reproduction checking image.

The storage device 5 has stored programs, data, etc., beforehand and includes a recording medium readable/writable by the CPU 2 such as a magnetic or optical recording medium or a semiconductor memory. The storage device 5 also includes a portable medium such as a CD-ROM, or a memory card, and a fixed medium such as a hard disk. A part or all of the programs, data, etc., stored in the storage medium may be received from a server or a client via a network such as a WAN (Wide Area Network) or a LAN (Local Area Network) through the transmission control unit 9. The storage device 5 may be a storage medium of the server or client installed on the network.

It may be arranged that the program is transmitted via a transmission medium such as a network line to the server or client to thereby install the program on a device provided on the server or client.

Figure 5:
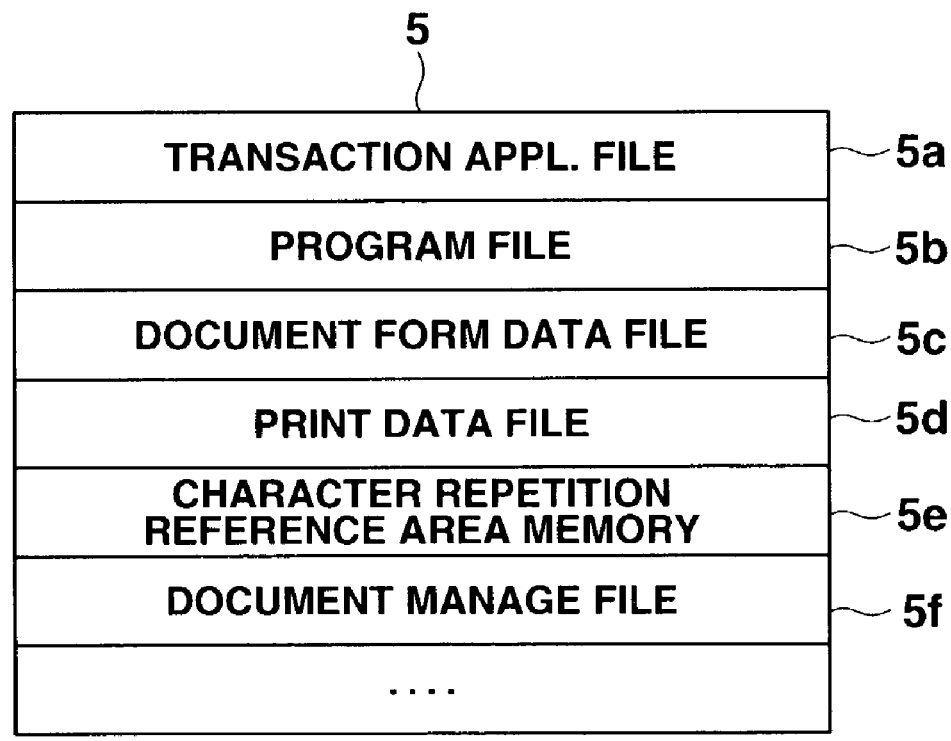
FIG. 5 schematically shows a structure of a file of a storage device 5 of FIG. 1.

FIG. 5 schematically illustrates a structure of a file in the storage device 5. As shown in FIG. 5, the storage device 5 includes a transaction application file 5*a*, a program file 5*b*, a document form data file 5*c*, a print data file 5*d*, a character repetition reference area memory 5*e*, a document management file 5*f*, etc.

The transaction application file 5*a* is for various application programs to be executed by the CPU 2, such as, for example, various transaction processes including creation of an estimate/statement of delivery.

The program file 5*b* is for, for example, a system program by which the CPU 2 controls the respective elements of the print control apparatus 1.

The document form data file 5*c* contains data indicative of a form of a document to be created by the statement outputting device 1. The document form data includes data determining the printing positions of various information, for example, on ruled lines, client names, commodity names, sums of money, etc. on a document such as an estimate, a statement of delivery or a bill.

The print data file 5*d* contains print data to be created by the transaction process such as, for example, client names, commodity names and sums of money.

The character repetition reference area memory 5*e* stores data indicative of arrangement of character strings in a reproduction checking image, more particularly, data on positions of a row, column, row and column spacings, and vertical and horizontal distortions of each of character strings in the reproduction checking image.

Figure 6:
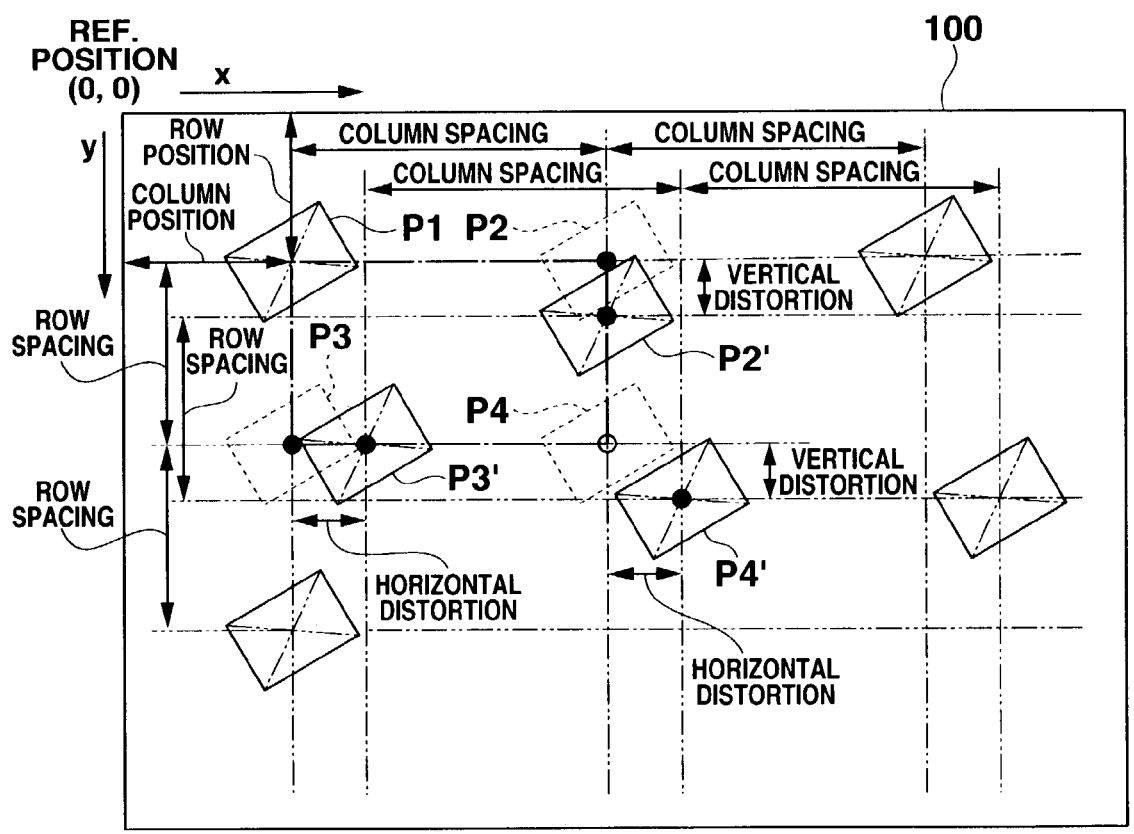
FIG. 6 illustrates an example of the positions of character strings to be disposed in a reproduction checking image produced by the document outputting apparatus 1.

Data to be stored in the character repetition reference area memory 5*e* will be described with reference to FIG. 6. FIG. 6 illustrates an example of the positions of character strings to be disposed in a reproduction checking image. In the reproduction checking image 100 of FIG. 6, x-y coordinate axes are set in which the upper left corner is used as a reference position (0, 0).

In FIG. 6, the position of each of imaginary frames, represented by reference symbols P1, P2, P3 and P4, where characters as part of a remaining image are disposed in the reproduction checking image 100 is a basic one. That is, in the print control apparatus 1, character strings are disposed in the four imaginary frames P1, P2, P3 and P4 as one unit on the reproduction checking image 100. When a reproduction checking image is depicted in a larger area than the reproduction checking image 100 of FIG. 6, the CPU 2 repeatedly disposes the four imaginary frames P1-P4 while maintaining the mutual positional relationship in the whole area to thereby dispose the remaining images in the entire area of the reproduction checking image 100.

The size of the imaginary frames P1-P4 is determined depending on the size and number of characters to be inputted in the printing process (FIG. 10) to be described later. When an angle of the character strings is input, the imaginary frames P1-P4 are inclined depending on the angle.

The "column position" to be stored in the character repetition reference area memory 5*e* indicates a coordinate position in the x-axis direction from the imaginary frame P1 positioned at the upper left corner in FIG. 6. A "row position" indicates a coordinate position in the y-axis direction. The "row spacing" indicates a spacing between the adjacent imaginary frames in the x-axis direction. The "row spacing" indicates a spacing between the adjacent frames in the y-axis direction.

Therefore, the position of the imaginary frame P1 in the reproduction checking image 100 is determined by the values of the "row position" and "column position" to be stored in the character repetition reference area memory 5*e*. The position of each of the imaginary frames P2-P4 is determined by the values of the "row spacing" and "column spacing" concerned.

A rectangle shown by a dot-dashed line in FIG. 6 has four corner points representing the initial positions of the imaginary frames P1-P4 from which the respective imaginary frames P1, P2, P3 and P4 are movable.

When any one of the imaginary frames moves, the other imaginary frames are moved in conjunction with each other such that a rectangle whose corner points are given by the four imaginary frames P1, P2, P3 and P4 always forms a parallelogram.

For example, when any one of the imaginary frames, for example, P4, moves to an associated position, for example, P4' in the reproduction checking image 100 of FIG. 6, the other imaginary frames, for example, P2 and P3 are moved to their associated positions shown by reference symbols, for example, P2' and P3', respectively, in conjunction with the imaginary frame P4. It is to be noted in this case that the imaginary frame P1 is not moved in conjunction with any particular one of the other imaginary frames that move. When the imaginary frame P1 moves, all the other imaginary frames P2, P3 and P4 make a translation in conjunction of the imaginary frame P1.

When each of the imaginary frames moves in the reproduction checking image 100, a deviation of the imaginary frame from its initial position is stored as a "horizontal distortion" and a "vertical distortion" in the character repetition reference area memory 5*e* where the "horizontal distortion" indicates a deviation in the x-axis direction while the "vertical distortion" indicates a deviation in the y-axis direction.

When the imaginary frame P1 moves, the values of the "row position" and "column position" stored in the character repetition reference area memory 5*e* are updated with the values of those representing the position of the moved imaginary frame P1.

As described above, in the print control apparatus 1 the arrangement of the character strings in the reproduction checking image is determined by data representing the "row position", "column position", "row spacing", "column spacing", "vertical distortion", and "horizontal distortion" stored in the character repetition reference area memory 5*e*.

The printing device 6 comprises a color printer employing a printing system of a laser printer, inkjet printer or sublimation printer that prints fine dots, for example, in C (cyan), M (magenta), Y (yellow), K (black), R (red), G (green), or B (blue) under control of the CPU 2 to thereby to provide a desired document printed in the primary colors and their intermediate colors.

The display device 7 comprises a CRT (Cathode Ray Tube) or an LCD (Liquid Crystal Display) to display various pictures on its display screen in accordance with signals from the CPU 2.

The input device 8 comprises an key-in unit including character, numeral and function keys and an optional pointing device such as a mouse that generates an operation signal in accordance with the user's manipulation and outputs it to the CPU 2.

The transmission control unit 9 is composed of a network card, modem, TA (Terminal Adapter), or router, etc., for communicating with an external device via a communication network (not shown).

Figure 7A:
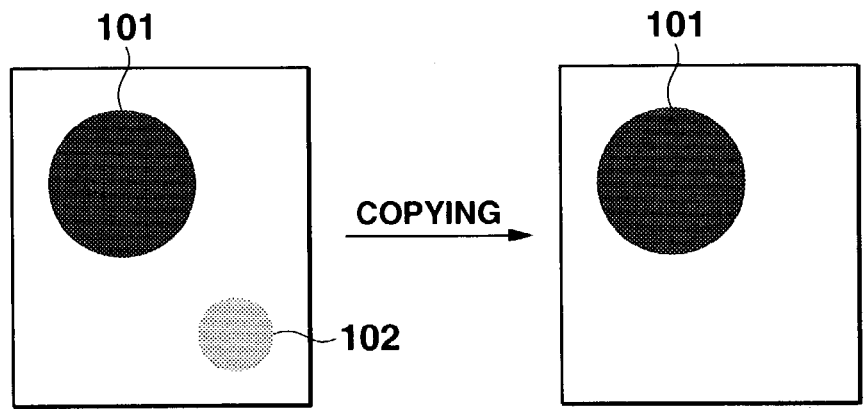
Figure 7B:
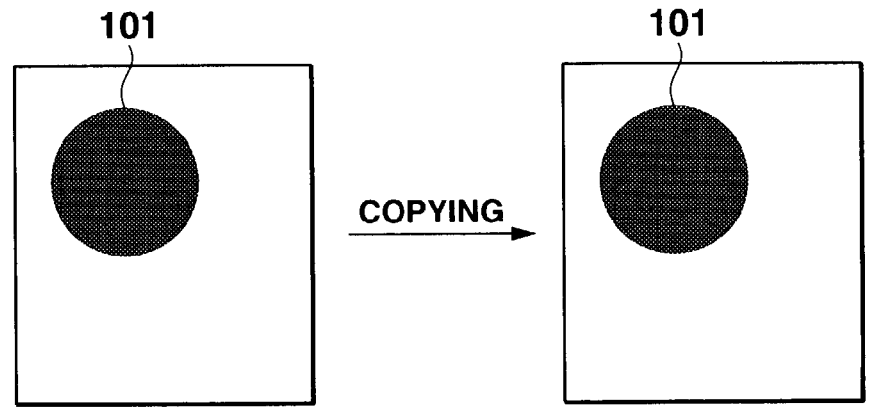
FIG. 7B shows that the reproduction checking image includes only a remaining image.
Figure 7C:
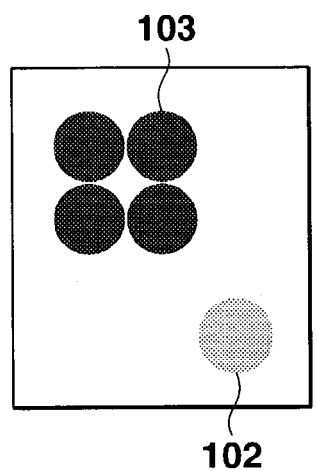
FIG. 7C shows another reproduction checking image including a vanishing image.
Figure 7D:
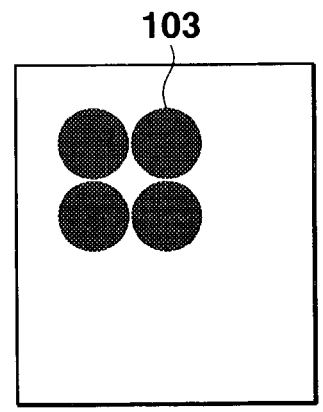
FIG. 7D shows another reproduction checking image including only a remaining image.

Operation of the first embodiment will be described next. FIG. 7A illustrates in an enlarged view that a reproduction checking image including a vanishing image composed of larger and smaller different-colored dots 101 and 102 created by the first embodiment copied as a different image of the larger dot. FIG. 7B illustrates that a reproduction checking image comprising a remaining image of a larger dot 101 is copied as an unchanged image. FIG. 7C illustrates a reproduction checking image comprising another vanishing image of four closely disposed larger colored dots 103 and one smaller different-colored dot. FIG. 7D illustrates the same remaining image 103 as in FIG. 7C.

The larger and smaller dots are larger and smaller than the minimum reference dot size detectable by the copying machine. The larger dot is detectable by the copying machine whereas the smaller dot is not.

Thus, in FIG. 7A it is indicated that the smaller dot 102 can not be copied and only the larger dot 101 is copied. When the larger and smaller dots 101 and 102 are different in color, the reproduction checking image on the original appears to have an intermediate color between those of the larger and smaller dots whereas the remaining image on a replica obtained by copying has the color of the larger dot 101. That is, the color of the resulting image appears discolored.

FIG. 7B shows a reproduction checking image composed of only a larger dot 101, which is reproducible without being discolored by the copying machine. Therefore, there is no difference between the original and the replica obtained by the color copying machine.

When the larger dots 101 of FIGS. 7A and 7B have the same color and the smaller dot 102 has a different color from the larger dots 101, the vanishing and remaining images appear to have different colors on their original documents. When the respective original documents are copied by the color copying machine, the vanishing image containing the small dot 102 (FIG. 7A) becomes a discolored image having the same color as the remaining image. Thus, the vanishing and remaining images on their documents are discriminated from each other, but the images obtained by copying cannot be discriminated from each other.

Figure 8:
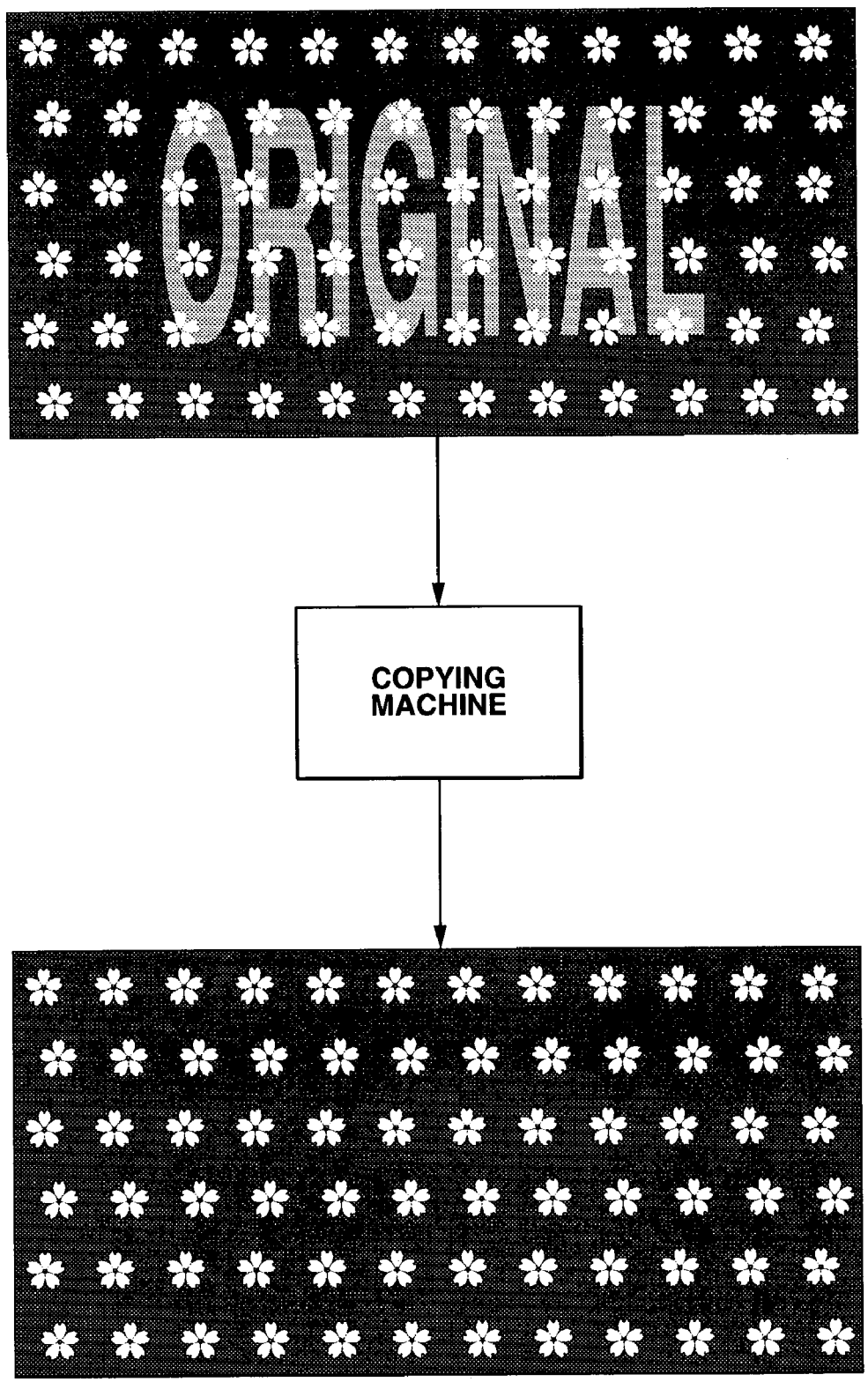
FIG. 8 shows one example of how a reproduction checking image using the vanishing and remaining images of FIGS. 7A-7D is copied.

A reproduction checking image of FIG. 8 is composed of a vanishing image of a character string "original" printed in the smaller colored dots 102 (FIG. 7A) on a background of a uniform pattern as a remaining image printed in the larger different-colored dots 101 (FIG. 7A) on a predetermined sheet of paper. Thus, they can be easily recognized visually on the original document. When the reproduction checking image of FIG. 8 is copied by the color copying machine, the character string "original" becomes discolored to have the same color as the background. Thus, the character string "original" appears to have vanished. Thus, the original document can be easily discriminated from the replica and hence it is greatly expected to check copying the original document.

As described above, the larger dots 101 of the vanishing and remaining images of FIG. 7A or 7B can be composed of a plurality of closely disposed dots 103 of the same size as the smaller dot 102, as shown in FIG. 7C.

In this case, the plurality of dots need not be printed respectively in different sizes by the printing device 6, so that the print control apparatus 1 is easily realized.

In addition, as shown in FIGS. 7C and 7D, when the larger dot is composed of a plurality of smaller different-colored dots 103 having the same size as the smaller dot 102, the vanishing or remaining image may have an intermediate color.

The general color printer prints a multiplicity of dots in inks and toner of primary colors so as to provide a desired intermediate color by adjusting the sizes and densities of the respective color dots. Therefore, one of the primary colors is used to print a single larger dot.

In contrast, if respective print colors of a plurality of dots 103 composing the larger dot of FIGS. 7C and 7D are specified in the present invention, each of the larger dot can be printed in combination of the primary colors. In this case, the larger dot has an intermediate color between the primary colors used for printing, so that the remaining image will have the intermediate color.

When a document on which the reproduction checking image of FIG. 7A is printed (print) is copied by a monochromatic copying machine, the larger dot 101 is printed in a gray color whose luminosity is depending on the luminosity of the original color thereof whereas the smaller dot 102 can not be copied by the monochromatic copying machine. Thus, in this case, the vanishing image is printed in a gray color whose luminosity is different from that of the original color, and the vanishing and remaining images are both printed in the same gray color having the same luminosity to thereby allow us to expect to check the copying of the original image.

While the respective colors of the larger dots 101 and the smaller dots 102 and 103 of the images of FIGS. 7A-7D can be determined optionally, the smaller dot 102 is preferably vanished completely by copying. Therefore, a color difficult to copy is preferably used for the smaller dot 102 compared to the larger dots 101 and the collection of smaller dots 103.

It can be determined based on the luminosity of each of colors to be used for the reproduction checking image whether or not the color is easily vanished when copied by the copying machine. The print control apparatus 1 processes colors to be printed by the printing device 6 as R, G and B digital data. Therefore, the luminosity of each color can be determined based on a Y value obtained from Y, I and Q digital values to which R, G and B digital data for representing the respective color data are converted.

One example of calculation expressions for converting R, G and B digital data to Y, I and Q digital data is shown as follows:

$$Y=0.30R+0.59G+0.11B$$

$$I=0.60R-0.28G-0.32B \tag{1}$$

$$Q=0.21R-0.52G+0.31B \tag{1}$$

Figure 9:
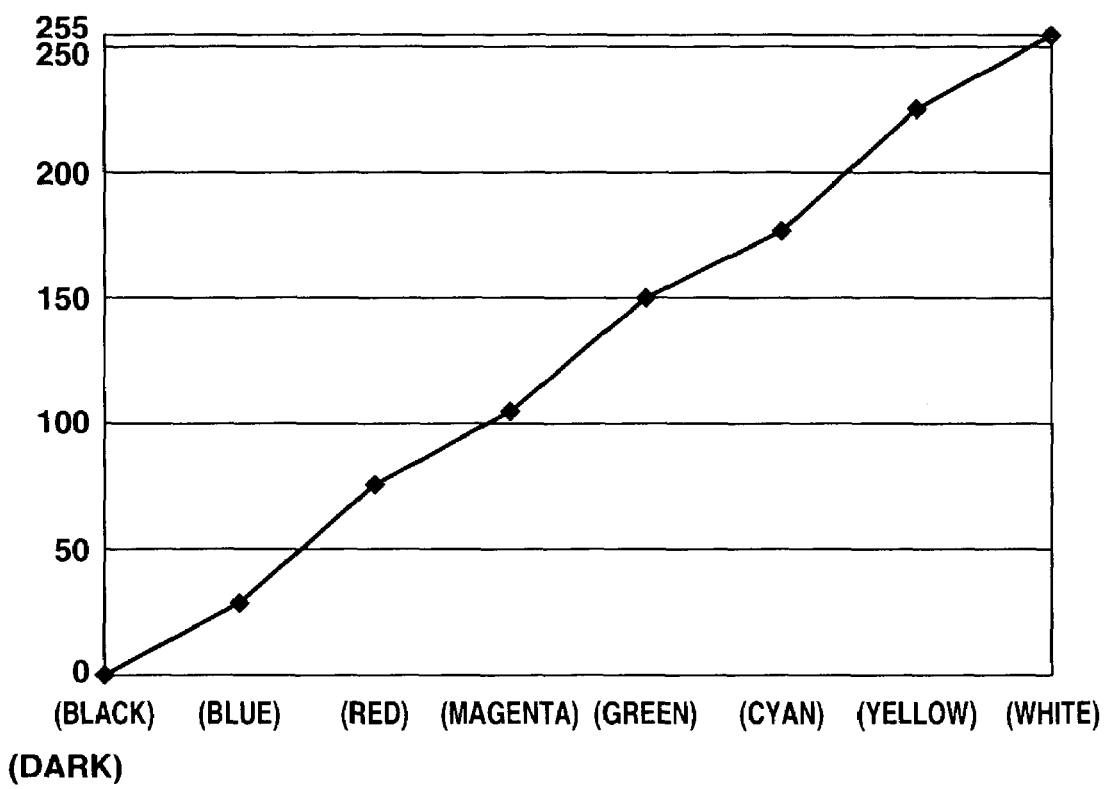
FIG. 9 is a graph of the luminosities of colors to be used in a general printer.

FIG. 9 is a graph of a luminosity of each of seven colors; R (red), G (green), B (blue), C (cyan), M (magenta), Y (yellow), and K (black) in which the minimum dot is printed by the general color printer, and white that is used to print in a colorless state on a white-plain blank.

In the graph of FIG. 9, the vertical axis represents luminosity and the horizontal axis represents respective colors. As shown in FIG. 9, when the eight colors are arranged as white, yellow, cyan, green, magenta, red, blue and black in order of high luminosity.

Since the smaller dot 102 of FIG. 7 preferably has a color that is not copied by the color copying machine, it can be determined based on the order of color luminosity of FIG. 9 which colors the larger dot 101 and the smaller dots 102 and 103 should have. Since in the first embodiment the dot structures of the remaining and vanishing images are determined by the unit remaining and vanishing pattern images set on the pattern image table 32 (FIG. 3), and if the dots of the unit remaining and vanishing pattern images have colors based on the order of color luminosity of FIG. 9, a preferable reproduction checking image is produced.

Figure 10:
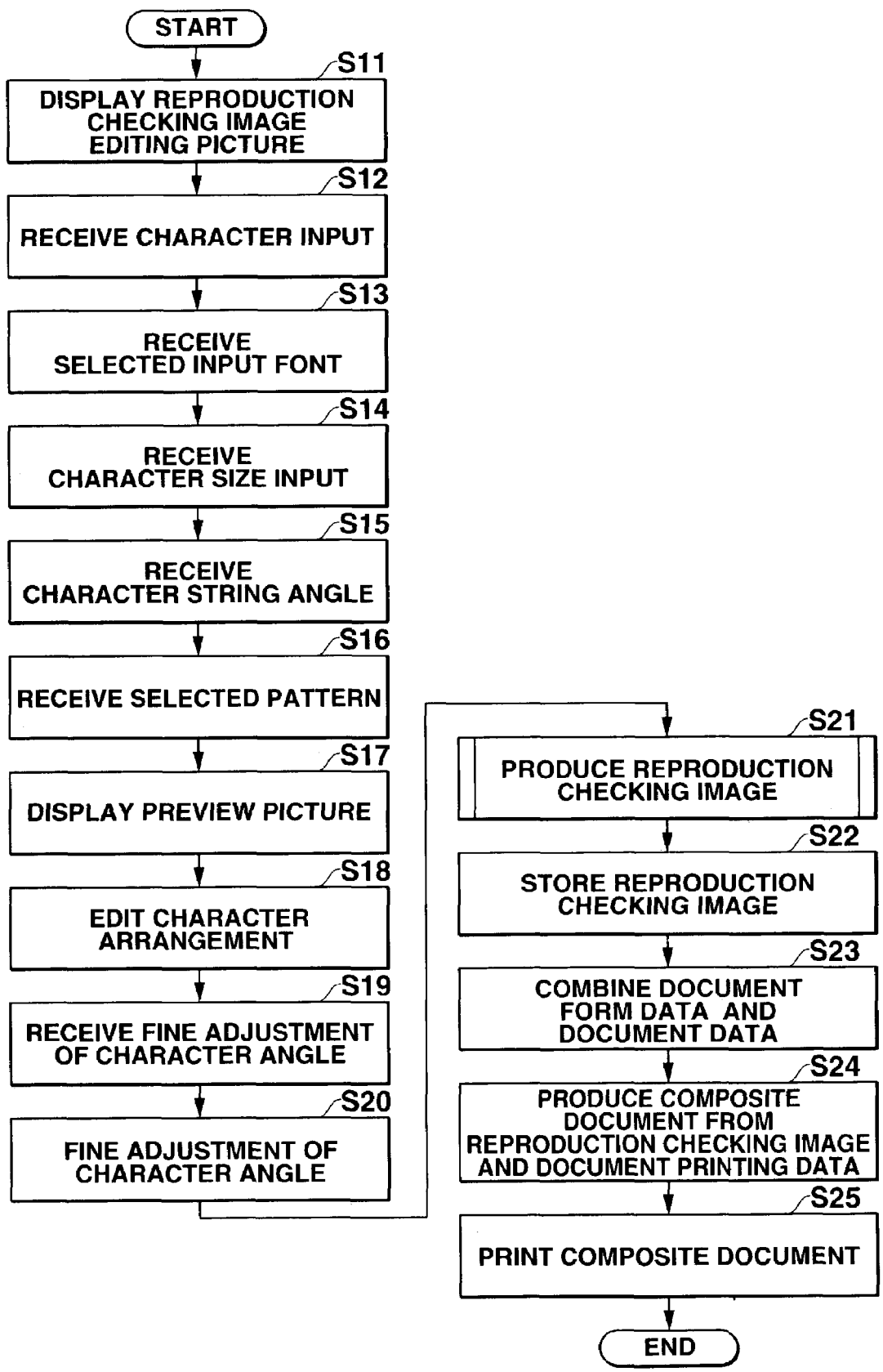
FIG. 10 is a flowchart of a printing process to be performed by the print control apparatus 1 of FIG. 1.

FIG. 10 is a flowchart indicative of the printing process to be performed by the CPU 2. FIG. 12 illustrates one example of the reproduction checking image editing picture 71 displayed on the display device 7 during the printing process of FIG. 10.

Disposed on the reproduction checking image editing picture 71 of FIG. 12 are a character input device 712 to input the conditions for producing a reproduction checking image, a font selector 713, a character size selector 714, a character angle input unit 715, and a pattern selector 716.

The character input device 712 is capable of directly inputting characters to be used as a reproduction checking image or selecting and inputting a desired one from among character candidates displayed simultaneously by depressing a pop-up button in the character input device 712. The candidates displayed simultaneously include characters for which the corresponding pop-up flags are set to "1" on the character attribute table 31 of FIG. 2.

The font selector 713 is capable of selecting and inputting a desired one from candidates for fonts of characters to be used as a reproduction checking image and displayed simultaneously by depressing the pop-up button.

The character size selector 714 is capable of selecting and inputting a desired one from candidates for the sizes of the characters to be used as the reproduction checking image and displayed simultaneously by depressing the pop-up button.

The character angle input unit 715 is capable of inputting an angle of characters to be used in the reproduction checking image.

The pattern selector 716 is capable of selecting and inputting a desired one from candidates for patterns to be used as reproduction checking images by depressing the pop-up button. The candidates of patterns displayed simultaneously are represented by the respective kinds of patterns stored on the pattern image table 32.

The reproduction checking image editing picture 71 is also provided with a settlement command button 717 to command the CPU 2 to settle the inputs given by the character input unit 712, font selector 713, character size selector 714, character angle input device 715 and pattern selector 716.

A preview unit 711 is disposed on the reproduction checking image editing picture 71 to display substantially the reproduction checking image produced by the CPU 2 in accordance with the inputs settled by the settlement command button 717. A plurality of reproduction checking characters 718 are disposed at predetermined positions on the reproduction checking image displayed on the preview unit 711.

It is possible to edit the arrangement of the reproduction checking characters 718 on the reproduction checking image by moving the reproduction checking characters 718 displayed on the preview unit 711 in accordance with manipulation of the pointing device.

When the printing process of FIG. 10 starts, the CPU 2 first displays the reproduction checking image editing picture 71 on the display screen of the display device 7 (step S11). Then, when desired inputs are given at the character input device 712, font selector 713, character size selector 714, character angle input device 715 and pattern selector 716 on the reproduction checking image editing picture 71 and settled by the settlement command button 717, the CPU 2 receives character inputs from the character input unit 712 and temporarily stores the input data in the work area of the RAM 4 (step S12). Similarly, the CPU 2 receives the selected input of the character fonts, the character size input, the angle input for the character string, and the selected pattern input from the font selector 713, the character size selector 714, the character angle input unit 715, and pattern selector 716, respectively, and stores them in the work area of the RAM 4 (steps S13, S14, S15, S16).

Also, the CPU 2 reads out unit remaining and vanishing pattern images corresponding to the input at the pattern selector 716 from the pattern image table 32 stored in the ROM 3 and disposes the unit remaining pattern image repeatedly throughout the whole preview unit 711. The CPU 2 then produces reproduction checking characters 718 having the same color as the unit vanishing pattern image from the character string specified by the input contents received at steps S12-S14. The CPU 2 then disposes the reproduction checking characters 718 based on the data stored in the character repetition reference area memory 5e of the storage device 5 and the input contents received at step S15 to thereby produce a reproduction checking image for previewing purposes and display it on the preview unit 711 (step S17).

When the CPU 2 is commanded to move the reproduction checking characters 718, displayed on the preview unit 711, by the pointing device, the CPU 2 receives the command and updates data stored in the character repetition reference area memory 5e and the display presented on the preview unit 711 (step S18).

When the CPU 2 is further commanded by the pointing device to change the angle of the reproduction checking characters 718 displayed on the preview unit 711, the CPU 2 receives this command (step S19), updates the data stored in the character repetition reference area memory 5e and the display presented on the preview unit 711 in accordance with the command (step S20).

The CPU 2 then executes a reproduction checking image producing process to thereby produce a reproduction checking image to be printed by the printing device 6 (step 21), and then temporarily stores this image in the work area of the RAM 4 (step S22). The reproduction checking image producing process at step S21 will be described later in more detail.

Then, the CPU 2 reads out form data for a document and print data to be printed by the printing device 6 from the document form data file 5c and print data file 5d, respectively, and then combines them to produce document print data (step S23). The CPU 2 then combines the document print data produced at step S23 and the reproduction checking image produced at step S22 to produce composite document data (step S24). The CPU 2 then causes the printing device 6 to print the corresponding document based on the produced composite document data (step S25).

Figure 11:
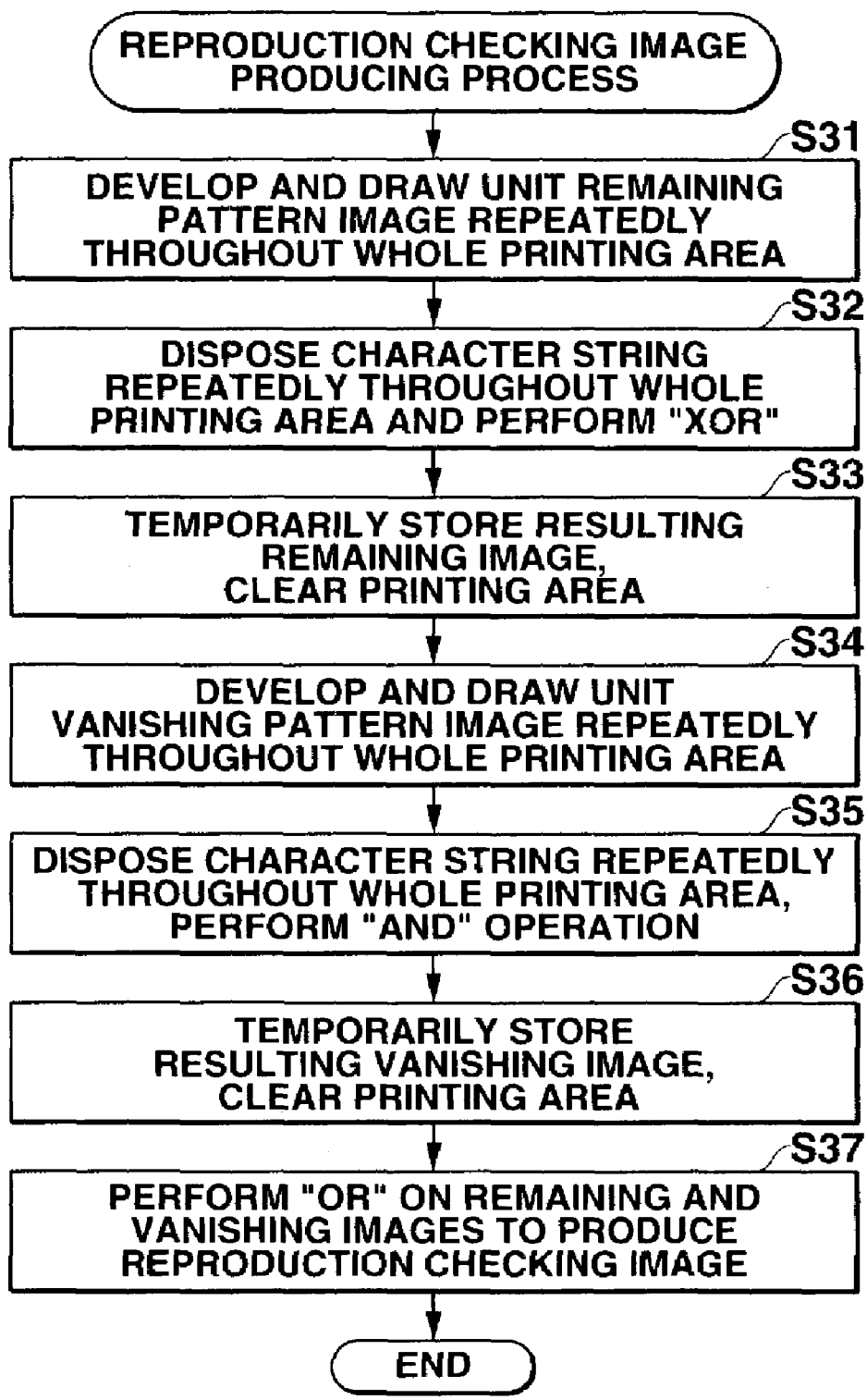
FIG. 11 is a flowchart indicative of the details of a reproduction checking image producing process shown at step S21 of FIG. 10.

FIG. 11 is a flow chart indicative of the details of the reproduction checking image producing process at step S21 of FIG. 10. In this process, the CPU 2 disposes repeatedly throughout the whole printing area the unit remaining pattern image read out from the pattern image table 32 based on the input received at step S16 (FIG. 10) and depicts remaining image dots (step S31). The unit remaining pattern image stored on the pattern image table 32 is a minimum structure unit to be developed in the printing area, and the CPU 2 arranges the unit remaining pattern images repeatedly throughout the whole printing area.

The printing area refers to an area where an image is to be developed, and is provided so as to correspond to an area on the document where the reproduction checking image is to be printed.

Then, the CPU 2 repeatedly arranges the character string specified by the input received at steps S12-S14 (FIG. 10) throughout the entire printing area based on the data stored in the character repetition reference area memory 5e and the input received at step S15 (FIG. 10), performs an XOR (exclusive AND) operation on the character string and the image dots depicted at step S31 to thereby depict a remaining image (step S32). That is, the CPU 2 depicts the remaining image in dots throughout the entire printing area, and erases dots that overlap with the character string to thereby provide the remaining image where the dots overlapping with the character string are eliminated.

Then, the CPU 2 temporarily stores the remaining image obtained at step S32 in the work area of the RAM 4 and then clears the printing area (step S33).

Subsequently, the CPU 2 arranges repeatedly throughout the entire printing area the unit vanishing pattern image read out from the pattern image table 32 based on the input received at step S16 (FIG. 10) to thereby depict the vanishing image in dots (step S34). Since the unit vanishing pattern image stored on the pattern image table 32 is a minimum structure unit to be developed in the printing area, the CPU 2 arranges the unit vanishing pattern images repeatedly throughout the entire printing area at step S34.

Then, the CPU 2 arranges repeatedly throughout the entire printing area the character string specified by the input contents received at steps S12-S14 (FIG. 10) based on the data stored in the character repetition reference area memory 5e and the input received at step S15 (FIG. 10), overlaps the print area of the arranged character strings with the printing area of the dot image drawn at step S34, and performs an AND operation on the vanishing image dots disposed on the printing area at step S34 and the disposed character strings to thereby produce a vanishing image (step S35). In this case, the CPU 2 leaves only the dots depicted at the positions where they overlap with the image of each character string and erases the other dots, which provides a vanishing image cut out so as to have the same shape as the character string.

The CPU 2 then temporarily stores the vanishing image obtained at step S35 in the work area of the RAM 4 (step S36).

Then, the CPU 2 causes the remaining image and the vanishing image stored in the work area of the RAM 4 to be overlapped and performs an OR operation on the remaining and vanishing images to produce a reproduction checking image comprises a combination of a vanishing image of the character string and a remaining image as a background (step S37).

Subsequently, an estimate as a document to be printed out in the printing process of FIG. 10 will be described next as an example. FIG. 13 shows an example of an estimate form to be stored in the document form data file 5c of the storage device 5 when the estimate is created by the estimate outputting device 1. The document form of FIG. 13 includes a form of the estimate such as the positions of ruled lines for the document and the printing positions of dates.

FIG. 14 shows print data contained in the printing data file 5d of the storage device 5. The print data of FIG. 14 includes data such as commodity names/prices to be produced by a transaction application and to be printed on the document.

Figures 15, 16:
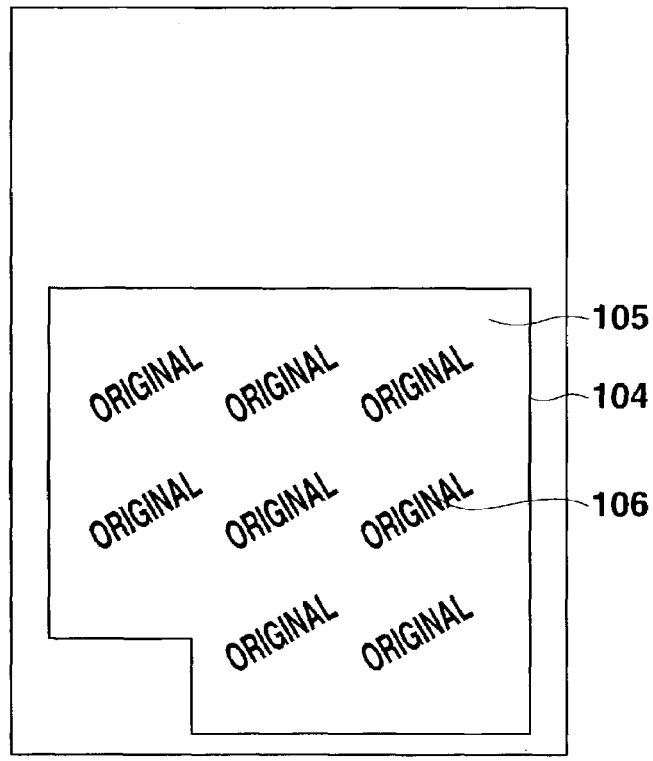
FIG. 15 illustrates one example of a document printing image synthesized from the document form of FIG. 13 and the print data of FIG. 14.
FIG. 16 illustrates one example of a reproduction checking image produced by the print control apparatus 1.

Document printing data of FIG. 15 is composed of the document form data of FIG. 13 and the print data of FIG. 14. A general estimate is created by printing the document print data as it is.

FIG. 16 shows an example of reproduction checking images produced when the estimate was created. The reproduction checking images of FIG. 16 are each composed of a remaining image 105 disposed throughout the entire printing area 104 and vanishing images 106 of a character string "original".

A composite document of FIG. 17 is obtained by combining the document print data of FIG. 15 and the reproduction checking image of FIG. 16. In the composite document of FIG. 17, reproduction checking images are disposed only in an area of commodity names and prices in the estimate. Thus, according to the composite document of FIG. 17, reproduction of the area where the commodity names and prices are recorded is checked.

When a document on which the synthetic document data of FIG. 17 is printed by the printing device 6 is copied by the copying machine, the character strings "original" printed as the vanishing image vanish. Therefore, a copy completely different from the original document created by the print control apparatus 1 is only provided by the copying machine, and illegal copying is checked.

As described above, according to the first embodiment of the present invention, when a reproduction checking image is created, larger dots copyable by the general copying machine and smaller different-colored dots difficult to copy by the copying machine are used to create the reproduction checking image composed of a vanishing image which will be discolored when copied by the copying machine and a remaining image that will remain unchanged even when copied. The reproduction checking image is then printed on a document by the printing device 6. Thus, when the printed image is copied by the general copying machine, its smaller dots will vanish. Thus, an area corresponding to the vanishing image will be discolored, thereby producing a visual effect that has not been encountered in the prior art to thereby strongly check copying the original.

Even when an original document created by the print control apparatus 1 is copied by a monochromatic copying machine, the smaller dots of the document will vanish to thereby change the luminosity of the area of the vanishing image, and a resulting reproduction is quite different from the original. Thus, it is expected to produce the effect of strongly checking the copying of the original.

Especially, when a reproduction checking image formed on a document by the document output device 1 includes a vanishing image of larger and smaller dots and a remaining image of larger dots the larger dots of vanishing and remaining images have the same color, and the smaller dots have a different color, the vanishing image and the remaining image are placed in exactly the same state on a reproduction obtained by the copying machine and can not be discriminated visually from each other. Thus, the vanishing image that is clearly recognized visually on the original document (print) vanishes to thereby produce the effect of strongly checking the copying of the original.

The vanishing image of the created reproduction checking image appears to have an intermediate color between those of the larger and smaller dots. That is, according to the print control apparatus 1, a reproduction checking image using the primary colors and their intermediate colors can be created. Thus, a degree of freedom for designing of the reproduction checking image is increased.

As shown in FIGS. 7C and 7D, if instead of each larger dot a plurality of smaller dots are used to compose each of the vanishing and remaining images, a plurality of primary colors may be used to print the plurality of smaller dots, respectively. Thus, an intermediate color can be used for the remaining image, so that a degree of freedom for designing the reproduction checking image is further increased.

While in the first embodiment the vanishing image composed of a character string has been illustrated, the present invention is not limited to this particular case. The vanishing images may include various patterns, figures or their combinations. There are no limitations to the patterns of the remaining image to be used, but various designs each of which includes a respective one of combinations of various curves, straight lines, figures, characters, etc., may be used for the remaining image.

While edition of the arrangement of the remaining images with reference to the four virtual frames P1, P2, P3 and P4 of FIG. 6 has been illustrated, the present invention is not limited to this particular case. The details of a specified structure of each of the elements of the print control apparatus 1 may be, of course, changeable on demand.

While it was illustrated in the first embodiment that the larger dots contained in had the same size and after copied, the remaining and vanishing images are placed in the same state, the present invention is not limited to this particular case. For example, by changing a dot structure of each of the vanishing and remaining images, the vanishing and remaining images may take different states after copied. For example, if the larger dots of the vanishing image are colorless, the vanishing image will be composed only of smaller dots than those of the remaining image. Thus, after copying, the remaining image will be printed remarkably deeply compared to the vanishing image. If the colors of the respective dots of the vanishing and remaining images are selected such that they appear to have the same color on the original document (print), characters/figures that can not be recognized visually on the original document will appear visually after copied. If the remaining image is, for example, colorless, the reproduction checking image can be created that will provide an image completely different therefrom when copied.

While in the first embodiment the remaining and vanishing images stored on the pattern image table 32 have been illustrated as having already determined with respect to patterns and dot colors, the present invention is not limited to this particular case. For example, the remaining and vanishing images can be created by combining the colors and patterns specified by the user on demand.

A second embodiment on this concept will be described next with reference to FIGS. 19-24. FIG. 19 schematically illustrates a structure of a pattern table 33 stored in the ROM 3 in the second embodiment. FIG. 20 schematically illustrates a structure of a color scheme table 34 stored in the ROM 3.

The second embodiment has the same in structure as the first embodiment except that a pattern table 33 and a color scheme table 34 are stored in the ROM 3 instead of the pattern image table 32 (FIG. 3) of the first embodiment. Like reference numerals are used to denote like elements throughout the Figures concerned.

The pattern table 33 of FIG. 19 has stored data on the kinds of patterns and their unit pattern images in corresponding relationship. The unit pattern image has a predetermined size and is represented in two values of white and black values. The kind of a pattern represents the name of the pattern.

Set on the color scheme table 34 of FIG. 20 in corresponding relationship are data on the sizes and colors of dots of unit remaining and vanishing pattern images to be used, as identified by respective serial numbers. For example, No. "1" represents that a unit remaining pattern image is composed of larger magenta dots, and that a vanishing pattern image is composed of larger magenta dots and smaller cyan dots.

Figure 21:
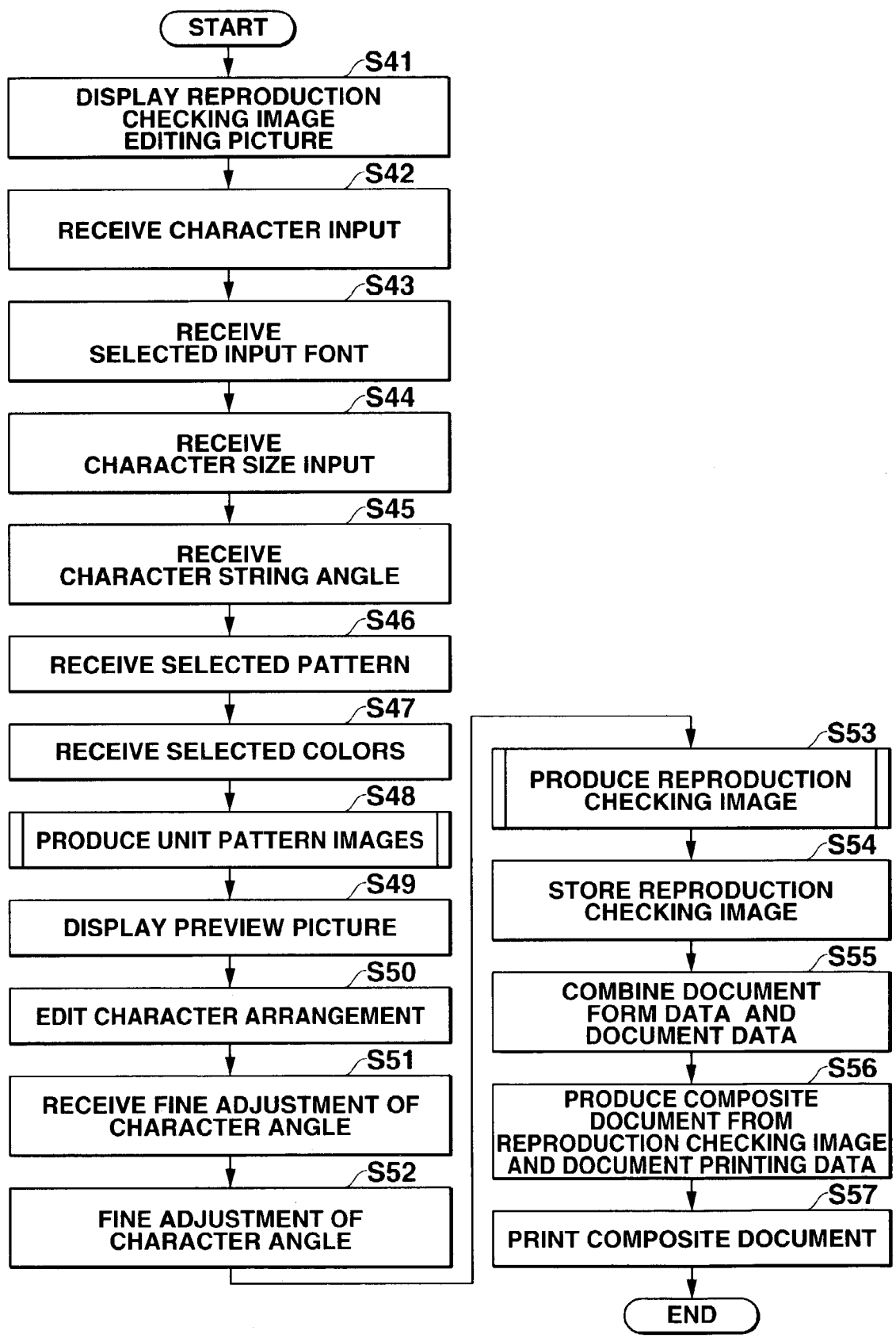
FIG. 21 is a flowchart of a printing process to be performed by a print control apparatus 1 in the second embodiment.
Figure 24:
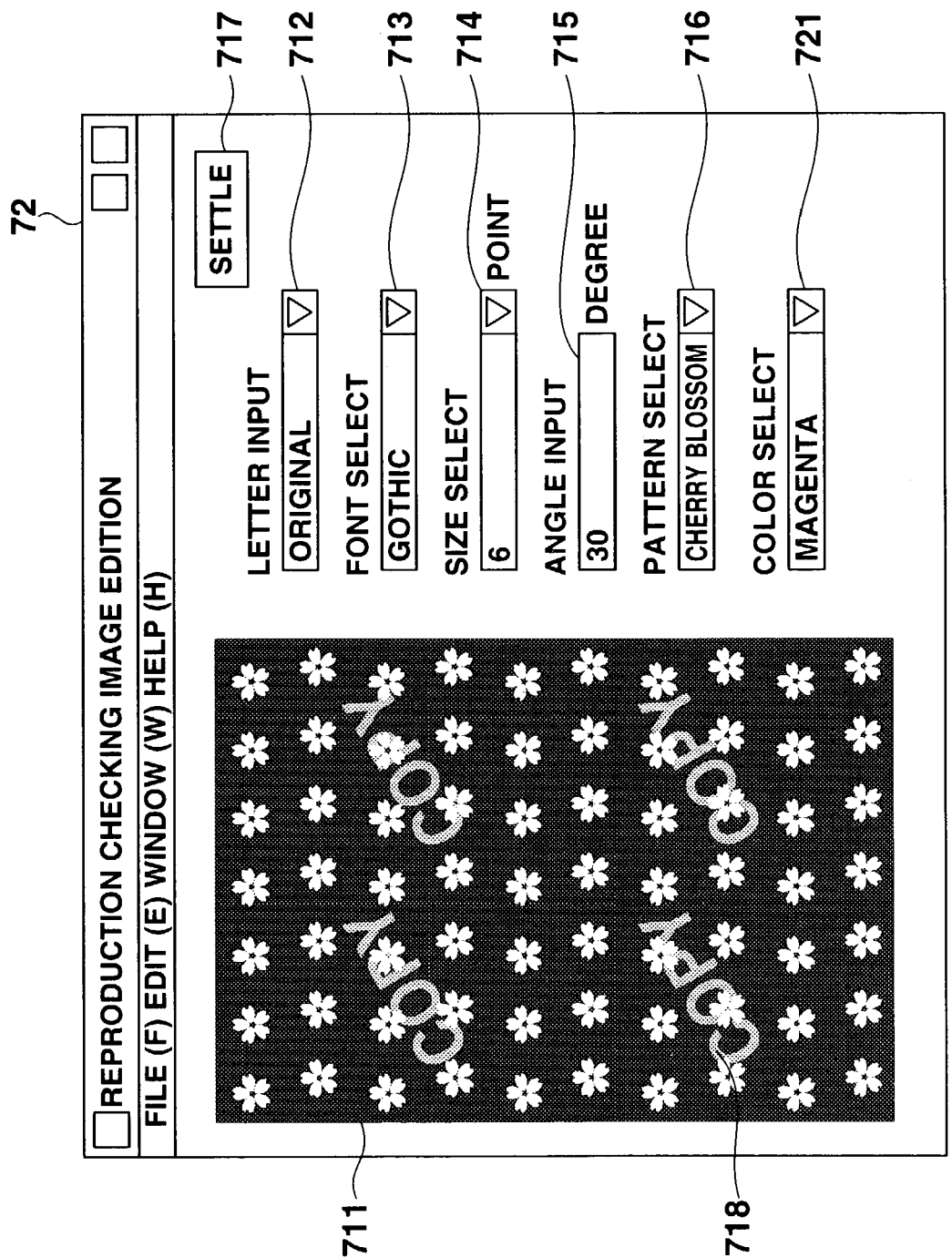
FIG. 24 illustrates one example of a reproduction checking image editing picture 72 presented on a display device 7 during the process of FIG. 21.

FIG. 21 is a flowchart indicative of a printing process to be performed by the print control apparatus 1 in the second embodiment. FIG. 24 illustrates one example of a reproduction checking image editing picture 72 displayed on the display device 7 during execution of the process of FIG. 21. Disposed on the picture 72 are a character input device 712, a font selector 713, a character size selector 714, a character angle input device 715, a pattern selector 716 and a settlement command button 717 as in the picture 71 (FIG. 12).

Also, disposed on the picture 72 is a color selector 721 that selects the color of a reproduction checking image. The color selector 721 is capable of selecting any one from among a plurality of candidates of colors displayed simultaneously by the pop-up button in accordance with the contents of the color scheme table 34.

When starting the printing process of FIG. 21, the CPU 2 first displays the reproduction checking image editing picture 72 on the display screen of the display device 7 (step S41).

When inputs are given at the character input device 712, font selector 713, character size selector 714, character angle input device 715 and pattern selector 716 of the reproduction checking image editing picture 71 and then settled by the settle command button 717, the CPU 2 temporarily stores these respective inputs in the work area of the RAM 4 (steps S42, S43, S44, S45, S46 and S47).

Then, the CPU 2 reads out pattern data corresponding to the input at the pattern selector 716, and data on the dot sizes and colors of the unit remaining and vanishing pattern images corresponding to the inputs at the color selector 721 and performs a pattern image producing process including production of the unit remaining and vanishing pattern images (step S48), which will be described later in more detail.

The CPU 2 then repeatedly disposes the unit remaining pattern image produced at step S48 throughout the entire display of the preview unit 711, produces as reproduction checking character string 718 the character string specified by the inputs received at steps S12-S14 and having the same color as the unit vanishing pattern image produced at step S48. The CPU 2 then disposes the reproduction checking character strings 718 based on the data stored in the character repetition reference area memory 5e of the storage device 5 and the input received at step S15 to thereby produce a reproduction checking image for previewing purposes, and displays this image on the preview unit 711 (step S49).

When the CPU 2 is commanded by the pointing device of the input device 8 to move the reproduction checking character strings 718 displayed on the preview unit 711, the CPU 2 receives the command and updates the data stored in the character repetition reference area memory 5e and the display presented on the preview unit 711 (step S50).

When the CPU 2 is commanded by the pointing device to change an angle of the repetition checking character strings 718 on the preview unit 711, the CPU 2 receives this command (step S51) and updates the data stored in the character repetition reference area memory 5e and the display presented on the preview unit 711 (step S52).

The CPU 2 then performs a reproduction checking image producing process in which a reproduction checking image to be printed by the printing device 6 is produced (step S53), and stored temporarily in the work area of the RAM 4 (step S54). The reproduction checking image producing process at step S53 is similar to that (FIG. 11) performed in the first embodiment, and further description thereof will be omitted therein.

The CPU 2 then reads out the document form data and print data to be printed on a document from the document form data file 5c and the print data file 5d, respectively, and synthesizes document print data from these read data (step S55). Then, the CPU 2 produces synthetic document data from the document print data produced at step S55 and the reproduction checking image produced at step S53 (step S56), and causes the printing device 6 to print a corresponding document based on the produced synthetic document data (step S57).

Figure 22:
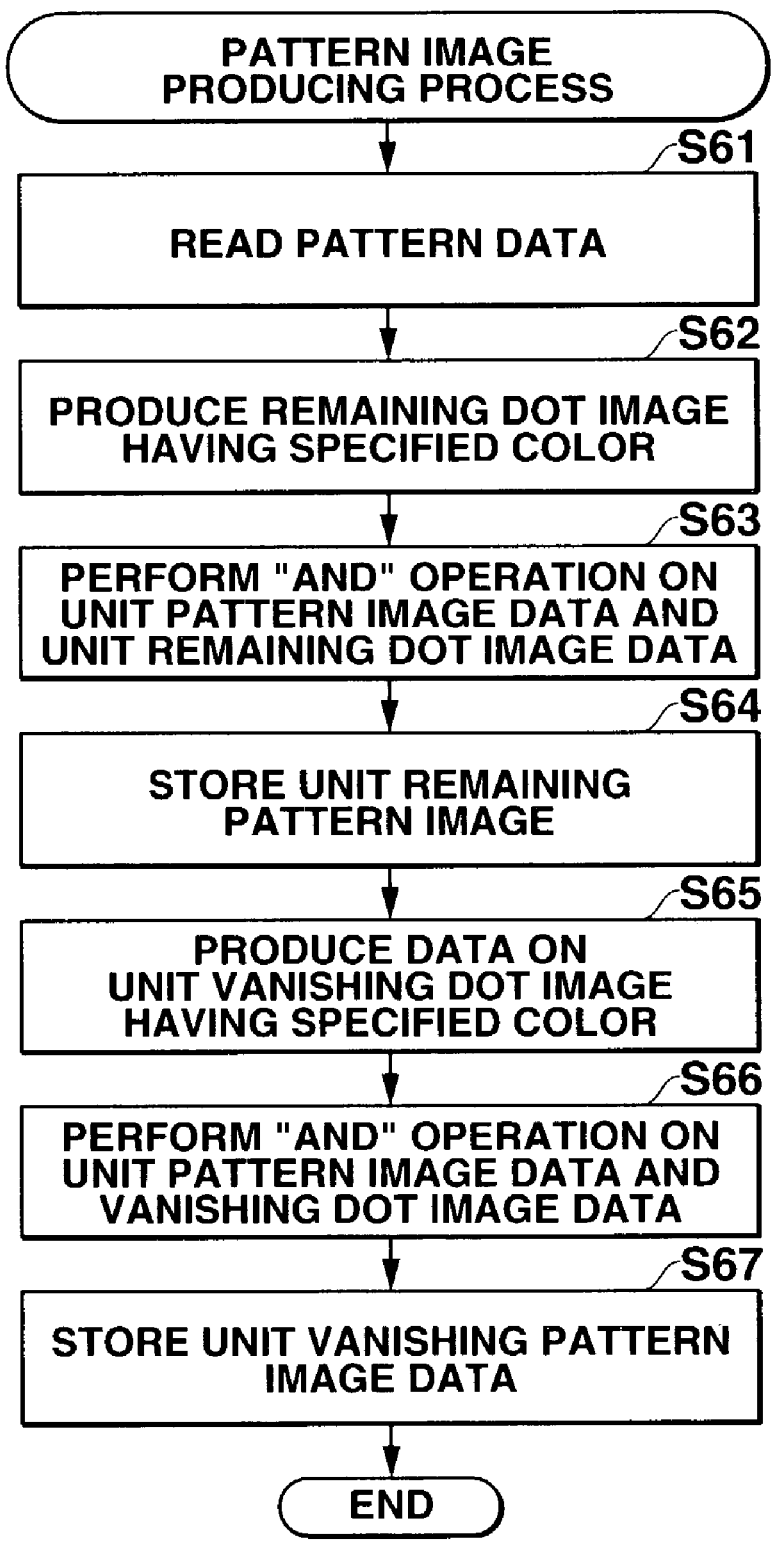
FIG. 22 is a flowchart indicative of the details of a pattern image producing process shown at step S48 of FIG. 21.

FIG. 22 is a flowchart indicative of the details of the pattern image producing process at step S48 of FIG. 21.

Figure 23A:
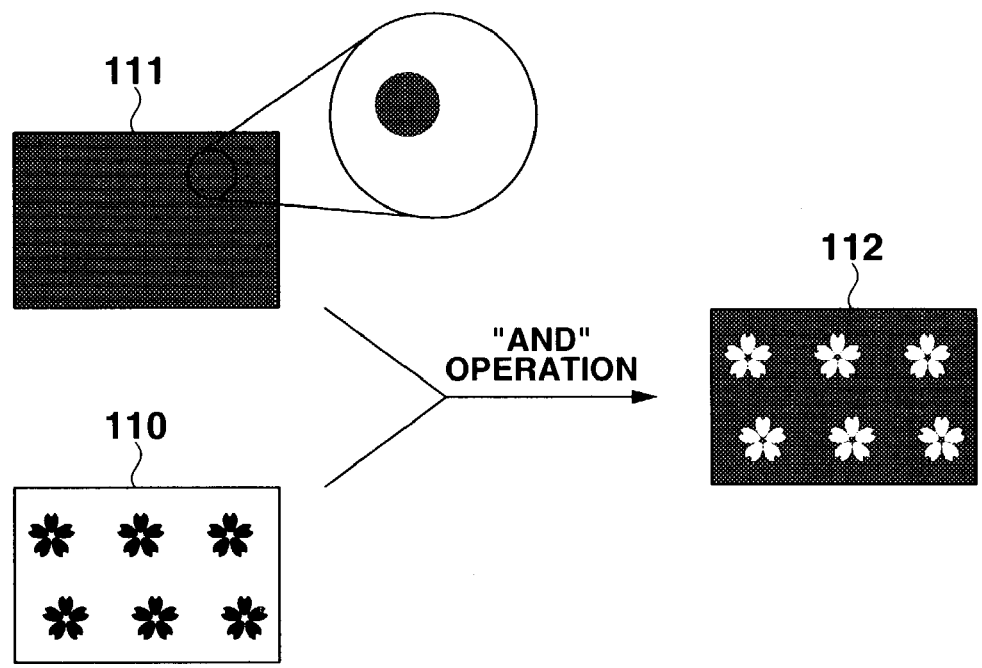
FIGS. 23A and 23B illustrate production of a unit remaining pattern image and a unit vanishing pattern image, respectively, in the process of FIG. 22.

The CPU 2 first fetches pattern data corresponding to the input given at the pattern selector 716 from the pattern table 33 stored in the ROM 3 (step S61). Subsequently, the CPU 2 fetches data on the dot sizes and colors of the unit remaining pattern image corresponding to the input at the color selector 721 from the color scheme table 34 of the ROM 3 and produces data on a unit remaining dot image 111 (FIG. 23A) in accordance with the fetched data (step S62). The unit remaining dot image has the same size as the unit pattern image and composed of dots disposed in accordance with the unit size and color of the unit remaining pattern image as shown in FIG. 23A.

The CPU 2 then performs an AND operation on the pattern data fetched at step S61 and the unit remaining dot image data produced at step S62 to produce a unit remaining pattern image (step S63) and stores this image in the work area of the RAM 4 (step S64).

According to the processing at the steps S62 and S63, if, for example, the unit pattern data represents a "pattern of cherry" and the unit remaining pattern image represents "larger: magenta", the unit remaining dot image of larger magenta dots disposed throughout its area is produced. By performing an AND operation on the produced unit remaining dot image and the unit pattern image, a unit remaining pattern image of the "pattern of cherry" composed of larger magenta dots is produced.

Then, the CPU 2 fetches data on a vanishing pattern image corresponding to the input at the color selector 721 from the color scheme table 34 stored in the ROM 3, and produces data on a unit vanishing dot image in accordance with the fetched data (step 65). The unit vanishing dot image has the same size as the unit pattern image and composed of dots disposed throughout its area in accordance with the dot size and color of the unit vanishing pattern image.

The CPU 2 then performs an AND operation on the pattern image data fetched at step S61 and the unit vanishing dot image data produced at step S65 to thereby produce a unit vanishing pattern image (step S66), and stores it in the work area of the RAM 4 (step S67).

Figure 23B:
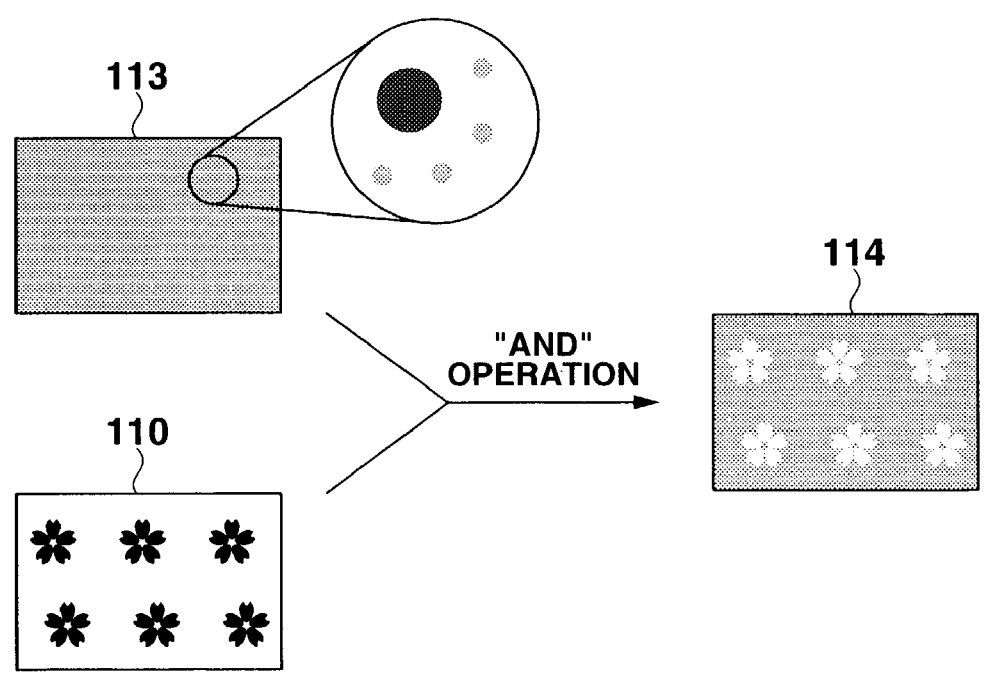

FIGS. 23A and 23B illustrate production of the unit remaining and vanishing pattern images, respectively, in the process of FIG. 22. As shown in FIG. 23A, the unit remaining dot image 111 produced in accordance with the dot size and color of the remaining pattern image on the color scheme table 34 includes larger dots disposed throughout the whole unit remaining dot image and having a color determined in accordance with dot color of the remaining pattern image. The unit pattern data 110 in this case represents a pattern of cherry blossoms in two of white and black with the black areas representing a shape of a cherry blossom.

By performing an AND operation on the unit pattern data 110 and the unit remaining dot image data 111, a unit remaining pattern image 112 is produced. Portions of the unit remaining pattern image 112 corresponding to the black portions of the pattern data 110 have no dots and are colorless. Portions of the unit remaining pattern image 112 corresponding to the white portions of the unit pattern data 110 have the same larger dot as the unit remaining dot image data 111.

As shown in FIG. 23B, the unit vanishing dot image data 113 produced in accordance with the dot size and color of the unit vanishing pattern image on the color scheme table 34 is composed of larger and smaller dots disposed throughout the entire area thereof and having colors determined in accordance with the colors of the unit vanishing pattern image.

By performing an AND operation on the unit vanishing dot image data 113 and the unit pattern data 110, a unit vanishing pattern image 114 is produced. Portions of the unit vanishing pattern image 114 corresponding to the black portions of the unit pattern data 110 are dotless and colorless whereas the portions of the unit vanishing pattern image 114 corresponding to the white portions of the unit pattern data 110 comprise larger and smaller dots disposed as in the unit vanishing dot image 113.

As described above, the user is able to produce a remaining image and a vanishing image using the colors selected on the reproduction checking image editing picture 72, and then create a reproduction checking image composed of the remaining and vanishing pattern images.

As described above, according to the second embodiment the user is able to combine the patterns and colors of each of the remaining and vanishing pattern images composing the reproduction checking image as the user desires to thereby further increase a degree of freedom of designing the reproduction checking image.

In the second embodiment, the sizes of the larger and smaller dots involving the unit remaining and vanishing dot image may be predetermined or determined appropriately depending on the use of the reproduction checking image. For example, when a reproduction checking image is created in which characters and figures visible on an original document (print) will vanish after copying, the larger dots involving the unit remaining and vanishing dot image may have the same size. By changing the dot size, a reproduction checking image can be created in which the characters/figures invisible on the original document appears after copying.

While in the first and second embodiments the examples of the vanishing pattern images in which the characters/figures visible on the original document (print) will all vanish have been illustrated, the present invention is not limited to these cases. For example, a reproduction checking image can be created in which a part of the characters/figures will vanish after copying, which will be described next as a third embodiment.

Referring to FIGS. 25-28, the third embodiment will be described next. FIG. 25 schematically illustrates a structure of a figure table 35 stored in the ROM 3 in the third embodiment.

The third embodiment has the same in structure as the first embodiment except that a figure table 35 is stored in the ROM 3 instead of the pattern image table 32 (FIG. 3). Like reference numerals are used to denote like parts throughout.

As shown in FIG. 25, the figure table 35 has stored various figure data about the names and kinds of the figures.

A print control apparatus 1 in the third embodiment creates a reproduction checking figure composed of various figures and prints it.

The figure data relates to a quadrilateral, a triangle, a circle or a design of a tree, etc. These figures are each composed only of either larger dots or a combination of larger and smaller dots as in the unit remaining and vanishing pattern images of the first and second embodiments.

Figure 26:
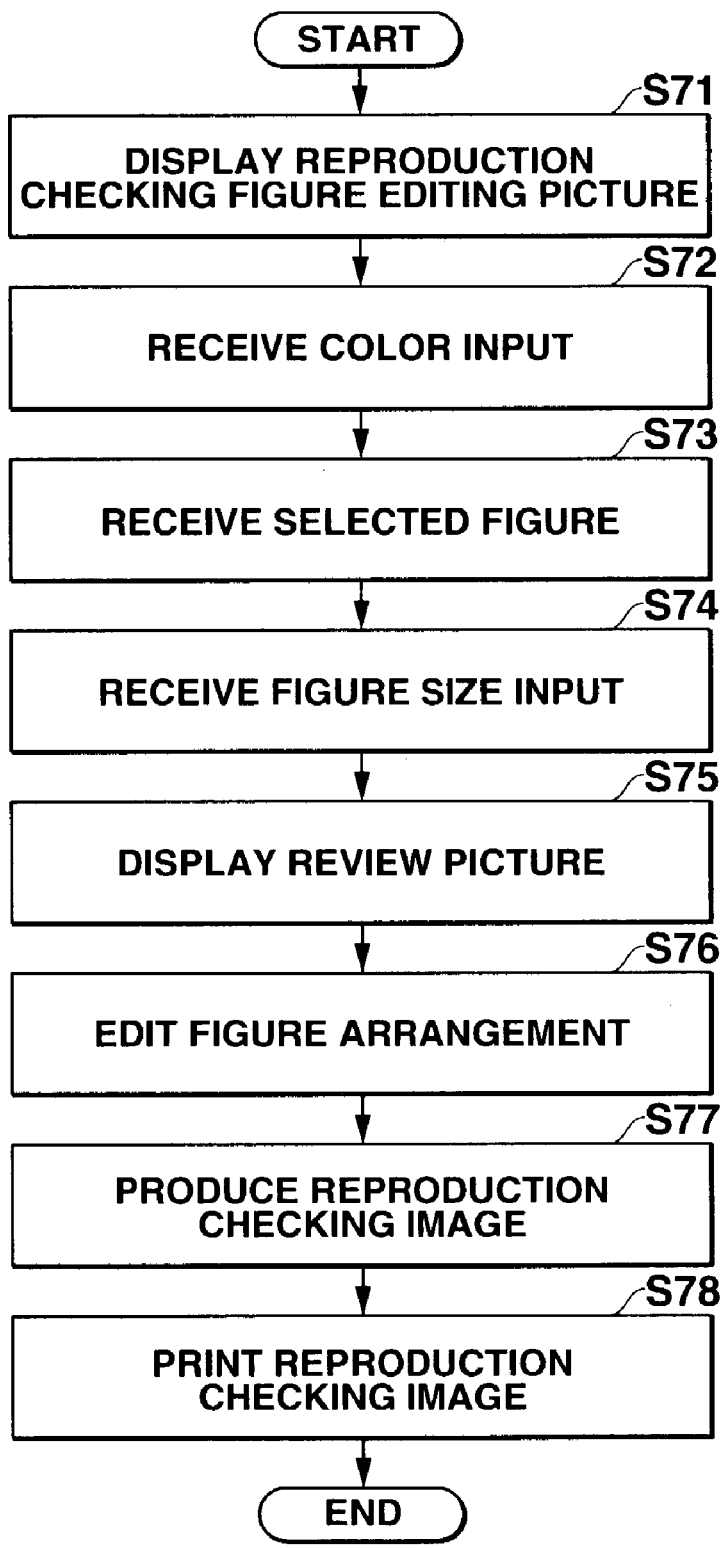
FIG. 26 is a flowchart of a printing process to be performed by a print control apparatus 1 in the third embodiment.
Figure 27:
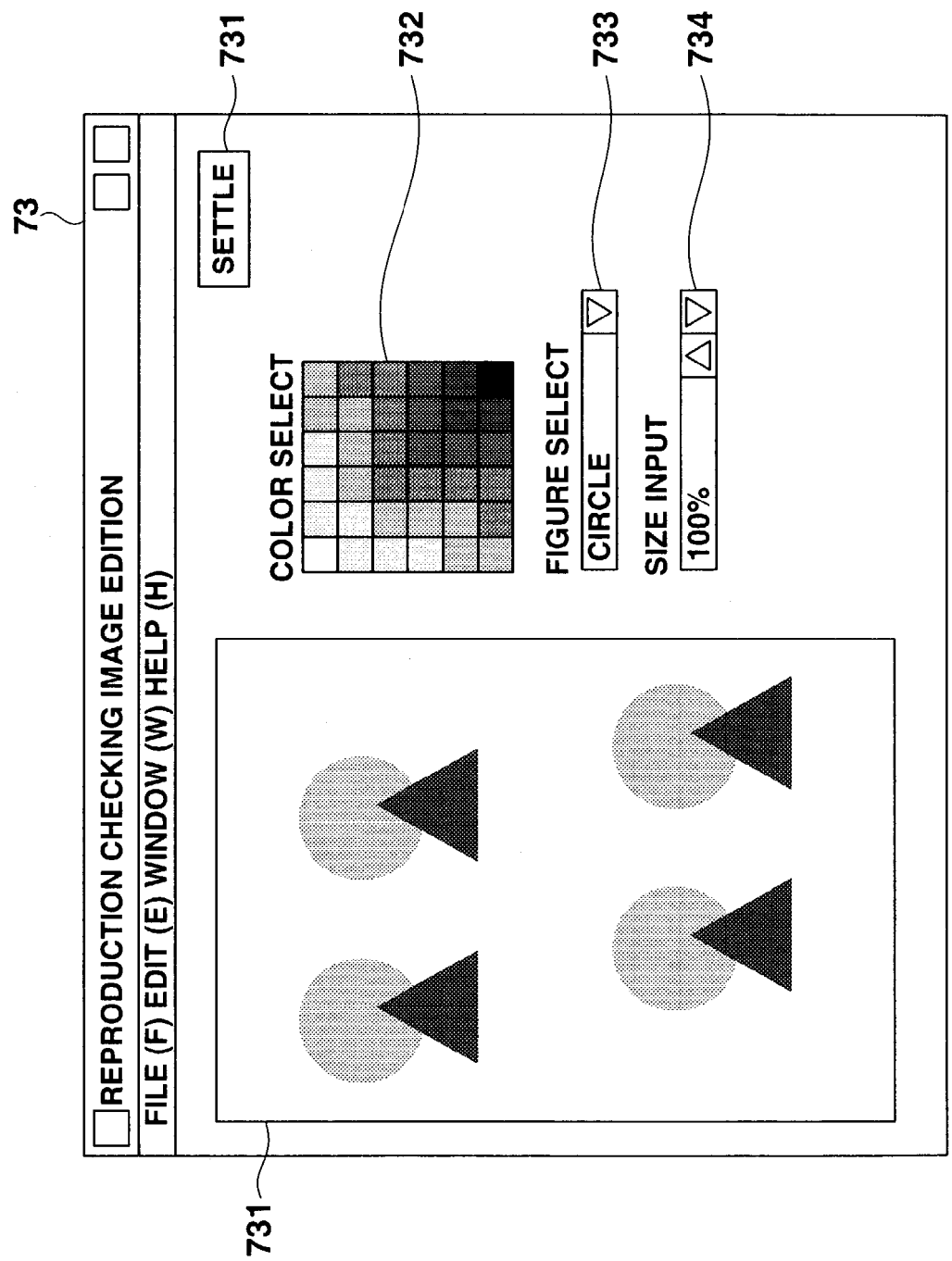
FIG. 27 illustrates one example of a reproduction checking figure editing picture 73 presented on a display device 7 during the printing process of FIG. 26.

FIG. 26 is a flowchart indicative of a printing process to be performed by the print control apparatus 1 in the third embodiment. FIG. 27 illustrates one example of a reproduction checking figure editing picture 73 displayed on the display device 7 during execution of the printing process of FIG. 26.

Disposed on the reproduction checking figure editing picture 73 of FIG. 27 are a figure selector 733, a figure size input device 734 to input the figure size selected at the figure selector 733, and a color selector 732 to input a print color for the figure selected at the figure selector 733.

As shown in FIG. 27, the color selector 732 includes a color palette on which usable colors are displayed simultaneously, one of which colors can be specified by the pointing device of the input device 8. The figure selector 733 is capable of selecting and inputting any one of figure candidates displayed simultaneously in accordance with the operation of the pop-up button and corresponding to the kinds of figures stored on the figure table 35.

The reproduction checking figure editing picture 73 has a settlement command button 735 that settles the respective inputs given at the color selector 732, figure selector 733, and figure size input device 734.

The reproduction checking figure editing picture 73 also has a preview unit 731, which schematically displays a reproduction checking figure created in accordance with the inputs settled by the settlement command button 735.

When the printing process of FIG. 26 starts, the CPU 2 displays the reproduction checking figure editing picture 73 on the display screen of the display device 7 (step S71).

Then, when inputs are given by the color selector 732, figure selector 733, and figure size input device 734 on the reproduction checking figure editing picture 73 and settled by the settlement command button 735, the CPU 2 receives and temporarily stores these inputs in the work area of the RAM 4 (steps S72, S73, S74).

Then, the CPU 2 reads out figure data corresponding to the input at the figure selector 733 from the figure table 35 stored in the ROM 3, sets the color of the figure image to the one represented by the input at the color selector 732, increases or decreases the size of the image in accordance with the input at the figure selector 733, disposes a resulting image at a predetermined position to thereby provide a reproduction checking image for previewing purposes, and displays it on the preview unit 731 (step S75).

When the CPU 2 is commanded to move the figure on the preview unit 731 by the pointing device of the input device 8, the CPU 2 receives the command stores in the work area of the RAM 4 information on the position of placement of figures of the reproduction checking figure, and updates the display presented on the preview unit 731 (step S76).

Then, the CPU 2 executes a reproduction checking figure producing process comprising the steps of reading figure data corresponding to the input at the figure selector 733 from the figure table 35 stored in the ROM 3, sets the color of the figures to colors corresponding to the input at the color selector 732, increases or decreases the sizes of the figures in accordance with the input at the figure selector 733, and disposes the respective figures in accordance with information stored in the work area of the RAM 4 to thereby produce a reproduction checking image (step S77). Then, the CPU 2 causes the printing device 6 to print this figure on paper (step S78).

Figure 28A:
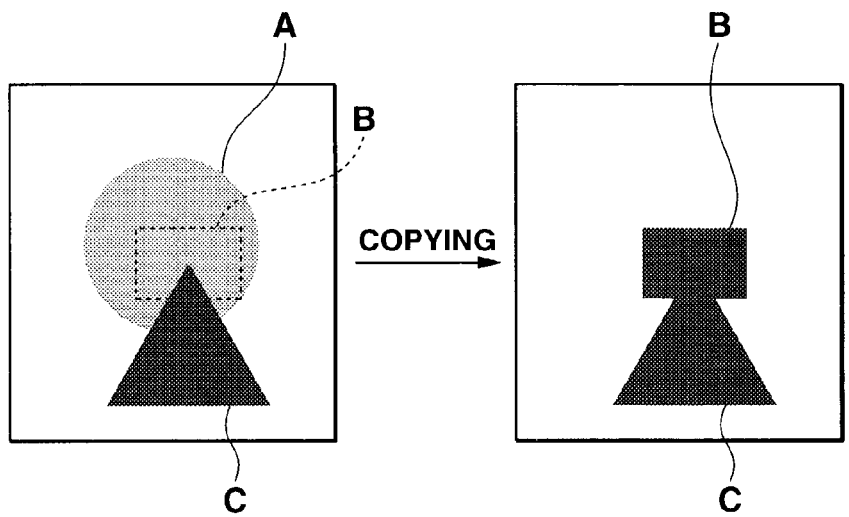
FIGS. 28A and 28B each illustrate one example of a reproduction checking figure produced by the print control apparatus 1 in the third embodiment.
Figure 28B:
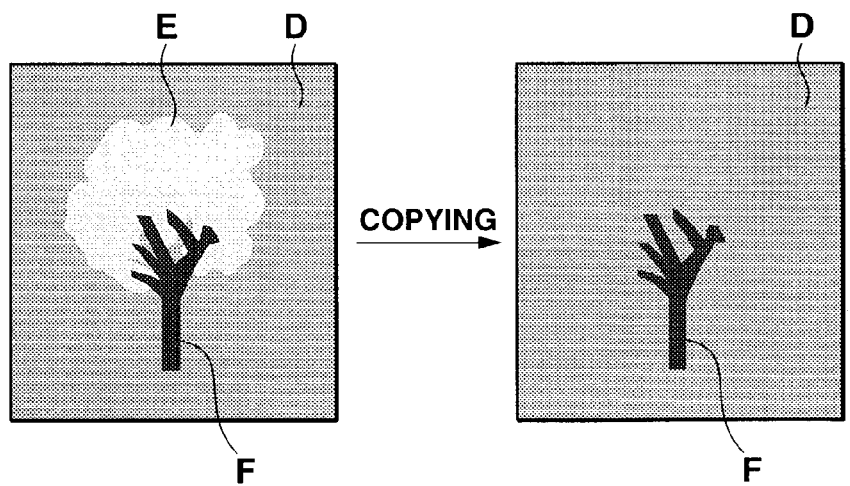

FIGS. 28A and 28B each show how a reproduction checking figure produced by the print control apparatus 1 in the third embodiment changes to another. The reproduction checking figure of FIG. 28A contains three kinds of figures A, B and C. The figures A and C are discolored when copied as in the vanishing image of the first embodiment. The figure A becomes colorless after discolored. The figure B is not discolored when copied, as in the remaining image of the first embodiment. The figure B has the same color as the figure A in the original print. When the reproduction checking figure of FIG. 28A is copied, the figure A vanishes, the figure B remains unchanged, and the figure C becomes discolored. Thus, the figure B hidden by the figure A in the original appears clearly due to the vanishment of the figure A.

The reproduction checking figure of FIG. 28A appears to be a combination of a circle and a triangle and its copy provided by the copying machine comprises a combination of a rectangle and a triangle. The reproduction checking figure of FIG. 28B contains a figure D representing the background, a figure E representing the shape of leaves of a tree, and a figure F representing the shape of a stem of the tree. The figures D and F remain unchanged when copied, as in the remaining image of the first embodiment. The figure E becomes discolored when copied, as in the vanishing image of the first embodiment. After the figure E is discolored by copying, it has the same color as the figure D.

When the reproduction checking figure of FIG. 28B is copied, the figure F becomes discolored and has the same color as the figure D. Thus, the figure E appears as if it vanished.

As described above, by printing a reproduction checking figure that contains a plurality of figures which vanish, become discolored or remain unchanged when copied, a print in which some figures look changed when copied is created. Since such print gives a remarkable visual change composed to the original, it is expected that it will produce the effect of strongly checking the copying.

The reproduction checking figure of the third embodiment can be printed on various documents such as estimates for using purposes, as in the reproduction checking images of the first and second embodiments, of course.

While in the third embodiment the colors of the respective figures to be used in the reproduction checking figure have been illustrated as determined by the input at the color selector 732 of the reproduction checking figure editing picture 73 (FIG. 27), the present invention is not limited to this case. For example, it may be determined automatically in accordance with the luminosity of a desired one of colors shown by the graph of FIG. 9 or a color suitable for the figure selected at the figure selector 733 may be displayed on the reproduction checking figure editing picture 73 for guiding purposes. In this case, a color easy to vanish may be used for a figure that will vanish when copied, as shown in the figure A of FIG. 28A, to thereby improve the effect of checking the copy.

In the reproduction checking figure editing picture 73, an input device may be provided for setting a background of a figure inputted at the figure size input device 734 may be provided on the reproduction checking figure editing picture to perform processing for the background of the figure in the printing process of FIG. 26. Of course, the reproduction checking figure editing picture 73 may be changeable on demand so as to perform other required processing.

What is claimed is:

1. A printing apparatus comprising:
   a first image forming unit which forms a first image part which is formed from large dots having a size larger than a minimum dot size readable by a color copying machine such that, if the printed image is reproduced by the color copying machine, a reproduction of the first image part outputted by the color copying machine has a same color as the first image part;
   a second image forming unit which forms a second image part which is formed from large dots having a size larger than the minimum dot size and small dots having a size smaller than the minimum dot size such that, if the printed image is reproduced by the color copying machine, a reproduction of the second image part outputted by the color copying machine has a different color than the second image part;
   a reproduction checking image forming unit which produces, as an original, a reproduction checking image which includes the first and second image parts where, if the reproduction checking image is reproduced by the color copying machine, a reproduction of the reproduction checking image outputted by the copying machine has a different color than the original reproduction checking image; and a printing unit which prints, in color as the original, the reproduction checking image produced by the reproduction checking image forming unit.

2. The printing apparatus of claim 1, wherein the large dots in the first image part are a same color as the large dots in the second image part, and the small dots in the second image part are a different color than the large dots.

3. The printing apparatus of claim 2, wherein, the color of the small dots has a higher luminosity than the color of the large dots.

4. The printing apparatus of claim 1, wherein each of the large dots comprises a collection of the small dots.

5. The printing apparatus of claim 4, wherein the collection of small dots comprises at least two different colored dots.

6. The printing apparatus of claim 4, wherein at least one of the first image part and the second image part comprises a pattern.

7. A computer readable storage medium having a computer program stored thereon that is executable by a processing unit of a printing apparatus, said computer program being executable by the processing unit to cause the printing apparatus to operate as:

a first image forming unit which forms a first image part which is formed from large dots having a size larger than a minimum dot size readable by a color copying machine such that, if the printed image is reproduced by the color copying machine, a reproduction of the first image part outputted by the color copying machine has a same color as the first image part;

a second image forming unit which forms a second image part which is formed from large dots having a size larger than the minimum dot size and small dots having a size smaller than the minimum dot size such that, if the printed image is reproduced by the color copying machine, a reproduction of the second image part outputted by the color copying machine has a different color than the second image part;

a reproduction checking image forming unit which produces, as an original, a reproduction checking image which includes the first and second image parts where, if the reproduction checking image is reproduced by the color copying machine, a reproduction of the reproduction checking image outputted by the copying machine has a different color than the original reproduction checking image; and a printing unit which prints, in color as the original, the reproduction checking image produced by the reproduction checking image forming unit.

8. A printing apparatus comprising:

means for forming a first image part which is formed from large dots having a size larger than a minimum dot size readable by a color copying machine such that, if the printed image is reproduced by the color copying machine, a reproduction of the first image part outputted by the color copying machine has a same color as the first image part;

means for forming a second image part which is formed from large dots having a size larger than the minimum dot size and small dots having a size smaller than the minimum dot size such that, if the printed image is reproduced by the color copying machine, a reproduction of the second image part outputted by the color copying machine has a different color than the second image part;

means for producing, as an original, a reproduction checking image which includes the first and second image parts where, if the reproduction checking image is reproduced by the color copying machine, a reproduction of the reproduction checking image outputted by the copying machine has a different color than the original reproduction checking image; and means for printing, in color as the original, the original reproduction checking image.

* * * * *